(12) United States Patent
Adema et al.

(10) Patent No.: US 12,147,056 B2
(45) Date of Patent: Nov. 19, 2024

(54) FRESNEL-REFLECTION-BASED LIGHT PICKOFF ELEMENT FOR LASER-BASED SYSTEMS

(71) Applicant: GOOGLE LLC, Mountain View, CA (US)

(72) Inventors: Daniel Adema, Kitchener (CA); Vance R. Morrison, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 662 days.

(21) Appl. No.: 17/399,566

(22) Filed: Aug. 11, 2021

(65) Prior Publication Data

US 2023/0047415 A1 Feb. 16, 2023

(51) Int. Cl.
*G02B 27/10* (2006.01)
*G02B 26/10* (2006.01)
*G02B 27/12* (2006.01)

(52) U.S. Cl.
CPC ......... *G02B 27/108* (2013.01); *G02B 26/105* (2013.01); *G02B 27/126* (2013.01)

(58) Field of Classification Search
CPC .. G02B 27/108; G02B 26/105; G02B 26/102; G02B 27/126; G02B 27/14
USPC ........................................................ 359/638
See application file for complete search history.

(56) References Cited

U.S. PATENT DOCUMENTS

| | | | |
|---|---|---|---|
| 6,172,812 B1 | 1/2001 | Haaland et al. | |
| 6,807,204 B1 | 10/2004 | O'Dowd | |
| 10,003,168 B1 | 6/2018 | Villeneuve | |
| 2011/0205501 A1 | 8/2011 | Cobb | |
| 2013/0176559 A1* | 7/2013 | Ogawa | G01N 21/9506 359/629 |
| 2014/0163534 A1* | 6/2014 | Angeley | A61B 3/102 606/4 |

(Continued)

FOREIGN PATENT DOCUMENTS

JP 2018-005162 A 1/2018

OTHER PUBLICATIONS

Pierre-Alexandre Blanche "Holographic combiners improve head-up displays", https://www.photonics.com/Articles/Holographic_combiners_improve_head-up_displays/a64487, May 2019, Photonics Spectra (Year: 2018).*

(Continued)

*Primary Examiner* — Brandi N Thomas
*Assistant Examiner* — Boutsikaris Leonidas

(57) ABSTRACT

A laser projection system is provided that includes at least one pickoff element or pickoff interface that redirects a portion of input laser light toward one or more photodetectors for purposes such as laser output power monitoring. An interface of a given pickoff element or a given pickoff interface uses Fresnel reflection to redirect the input laser light. The Fresnel reflection occurs due to a difference in indices of refraction between two materials that meet to form that interface. In some embodiments, a pickoff element is disposed in an optical path between a beam combiner and an optical scanner of the system. The pickoff element can be a plate beamsplitter, a cube beamsplitter, or a prism. In some embodiments, at least one pickoff interface is provided between two or more substrates of the beam combiner, the substrates that form a given pickoff interface having different respective indices of refraction.

23 Claims, 13 Drawing Sheets

(56) References Cited

U.S. PATENT DOCUMENTS

| | | | |
|---|---|---|---|
| 2015/0212326 A1 | 7/2015 | Kress et al. | |
| 2016/0033775 A1* | 2/2016 | Cox ................... | G02B 27/108 |
| | | | 359/485.02 |
| 2017/0285348 A1* | 10/2017 | Ayres ................... | G02B 6/0016 |
| 2018/0180885 A1* | 6/2018 | Holland ............... | H04N 9/3164 |
| 2019/0101767 A1 | 4/2019 | Geng et al. | |
| 2019/0253678 A1* | 8/2019 | Saracco ............... | H04N 9/3161 |
| 2020/0244030 A1* | 7/2020 | Apitz ................... | H01S 3/0604 |

OTHER PUBLICATIONS

Pierre-Alexandre Blanche, The University Of Arizona, "Holographic Combiners Improve Head-Up Displays", https://www.photonics.com/Articles/Holographic_Combiners_Improve_Head-Up_Displays/a64487, May 2019, 9 pages.

International Search Report and Written Opinion mailed Nov. 28, 2022 for PCT Application No. PCT/US2022/039922, 17 pages.

International Preliminary Report on Patentability mailed Feb. 22, 2024 for PCT Application No. PCT/US2022/039922, 11 pages.

* cited by examiner

FRESNEL-REFLECTION-BASED LIGHT PICKOFF ELEMENT FOR LASER-BASED SYSTEMS

BACKGROUND

A projector is an optical device that projects or shines a pattern of light onto another object (e.g., onto a surface of another object, such as onto a projection screen) in order to display an image or video on that other object. A laser projector is a projector for which the light source comprises at least one laser, where the laser is temporarily modulated to provide a pattern of laser light that is then spatially distributed over a display area of another object (e.g., a screen or lens) to display an image or video. In order to better control the performance of a laser projector, it is sometimes advantageous to monitor the laser output power of the laser projector. For example, accurately monitoring the laser output power of the laser projector would allow the laser projector to control the laser output power to adjust the white point and/or brightness of the display.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
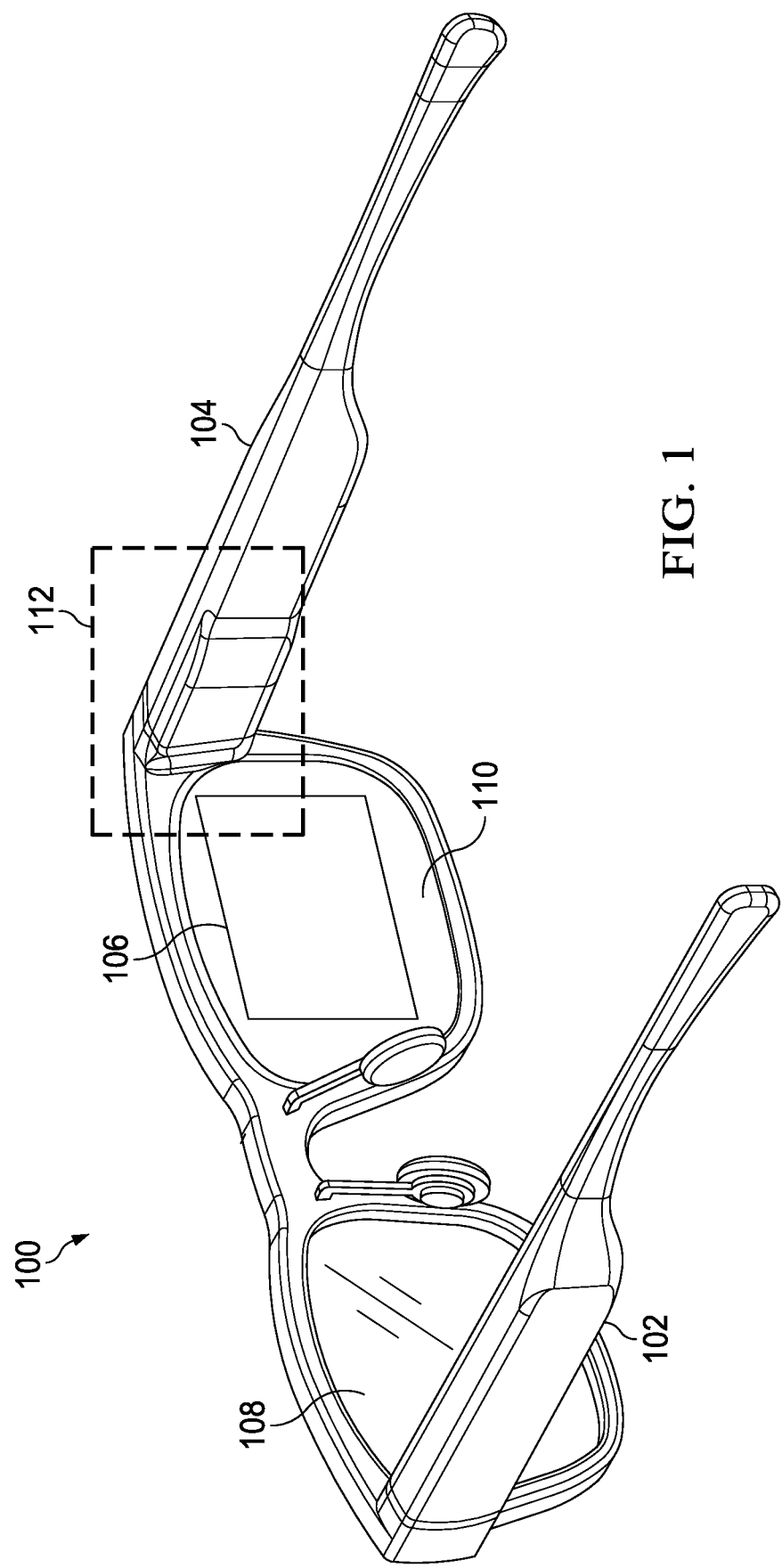
FIG. 1 is a diagram illustrating a display system having an integrated laser projection system, in accordance with some embodiments.

FIGS. 1-16 illustrate embodiments for compactly arranging a near-eye display system (e.g., a wearable heads-up display (WHUD)) or another display system. Using the techniques described herein, one or more portions of one or more laser inputs (sometimes referred to herein as "laser light beams") of a laser projection system of such a display system are redirected to one or more photodetectors via Fresnel reflection that occurs when the one or more laser inputs strike an interface between two materials having respectively different indices of refraction. For example, materials between which such an interface can be formed include, but are not limited to, any combination of N-BK7 Borosilicate Crown glass, fused silica, crown glass, flint glass, sapphire, diamond, Barium Fluoride, Calcium Fluoride, and air. Using Fresnel reflection to redirect a portion of a given laser light beam to a photodetector, rather than conventional coating-based approaches, provides a narrower transmission tolerance range, which desirably results in a more consistent amount of light from the laser light beam being directed to the photodetector. By improving the consistency of the amount of light that is redirected to the photodetector in this way, issues with insufficient photodetector sensitivity and oversaturation can be mitigated.

To illustrate, in order to better control the performance of a laser projector, it is sometimes advantageous to monitor the laser output power of the laser projector. For example, accurately monitoring the laser output power of the laser projector allows the laser projector to control the laser output power to adjust the white point and/or brightness of the display, thereby improving the user experience. In conventional laser projection systems, laser light is sampled or "picked-off" by using a pickoff optic having a dielectric coating that redirects a percentage of the laser light to a sensor. However, pickoff optics having reflective dielectric coatings are typically narrow-band and have an undesirably large tolerance range (e.g., transmittance tolerance range or reflectance tolerance range) for the amount of light that is redirected to the sensor, leading to an inconsistent amount of light being redirected to the sensor, and in turn potentially resulting in oversaturation of the sensor due to too much light being redirected to the sensor or resulting in the amount of light redirected to the sensor being too small to be reliably detected by the sensor. The systems and techniques described herein redirect light via a pickoff element having one or more interfaces between two materials having respectively different indices of refraction at which Fresnel reflection occurs. In some embodiments, a "Fresnel reflection" refers to the reflection of a portion of incident light at a discrete interface between two media having different refractive indices. By redirecting a portion of laser light within a given laser projection system via Fresnel reflection at such interfaces, the percentage of incident light that is redirected (e.g., toward a photodetector for laser output power determination) by pickoff elements or pickoff interfaces of the embodiments described herein is more consistent than that of conventional systems that rely on dielectric-coating-based pickoff optics, allowing for more consistency in the amount of light redirected to the photodetector for laser output power determination and corresponding display adjustment and thereby improving the user experience.

In some embodiments, a display system includes a laser projection system having a pickoff element disposed between a beam combiner and an optical scanner, where the pickoff element redirects a portion of input light toward a photodetector. In operation, modulatable laser light sources of the laser projection system provide laser light beams of respectively different wavelengths into the beam combiner, which combines the laser light beams into an aggregate laser light beam. The beam combiner outputs the aggregate laser light beam toward the optical scanner along an optical path that passes through the pickoff element.

In some embodiments, the pickoff element is a plate beamsplitter or a prism beamsplitter. In some such embodiments, one or more optical surfaces (i.e., planar surfaces through which the laser light passes) of the pickoff element are uncoated. An interface between a given optical surface of the pickoff element and air causes a Fresnel reflection of the input aggregate laser light beam, resulting in a portion of the input aggregate laser light beam being redirected toward the photodetector. It should be noted that this Fresnel reflection can be achieved without requiring a dielectric coating at the given optical surface of the pickoff element.

In some embodiments, the pickoff element is a cube beamsplitter comprising a first prism made of a first material having a first refractive index and a second prism made of a second material having a second refractive index that is different from the first refractive index, such that an interface between the first prism and the second prism causes a Fresnel reflection of the input aggregate laser light beam, resulting in a portion of the input aggregate laser light beam being redirected toward the photodetector.

In some embodiments, the display system includes a laser projection system having a beam combiner that incorporates one or more pickoff interfaces that uses Fresnel reflection to redirect a portion of input light toward a photodetector. Herein, a "pickoff interface" is considered to be a type of pickoff element. In operation, modulatable laser light sources of the laser projection system provide laser light beams of respectively different wavelengths into the beam combiner, which combines the laser light beams into an aggregate laser light beam. The beam combiner outputs the aggregate laser light beam toward the optical scanner along an optical path that passes through the pickoff interface. Each pickoff interface of the beam combiner uses Fresnel reflection to redirect a portion of one or more of the laser light beams or the aggregate laser light beam toward the photodetector.

In some embodiments, the beam combiner includes a secondary index substrate disposed between first and second primary index substrates, such that a first pickoff interface is disposed between the first primary index substrate and the secondary index substrate and a second pickoff interface is disposed between the second primary index substrate and the secondary index substrate. The primary index substrates are each made of first material having a first index of refraction, while the secondary index substrate is made of second material having a second index of refraction that is different from the first index of refraction. The difference between the first index of refraction and the second index of refraction causes light incident on the first and second pickoff interfaces to be redirected toward a photodetector via Fresnel reflection. In the present example, first portions of an aggregate laser light beam, upon being reflected by the first pickoff interface, travel along a first optical path, and second portions of the aggregate laser light beam, upon being reflected by the second pickoff interface, travel along a second optical path. In some embodiments, a width of the secondary index substrate causes the first optical path to at least partially overlap the second optical path. In some embodiments, a width of the secondary index substrate causes the first optical path to be non-overlapping with respect to the second optical path.

In some embodiments, a mirror is disposed in the first and second optical paths of the reflected first and second portions of the aggregate laser light beam, where the mirror is configured to reflect some or all of the first and second portions of the aggregate laser light beam back through the beam combiner and to a first photodetector. In some embodiments, the mirror is fully reflective (i.e., no light passes through the mirror; all or substantially all light is reflected by the mirror toward the photodetector). In some embodiments, the mirror is only partially reflective (and, therefore, at least partially transmissive) and a second photodetector is disposed to receive a first fraction of the first and second portions of the aggregate laser light beam that passes through the partially transmissive mirror, while a second fraction of the first and second portions is reflected toward the first photodetector. For example, the first photodetector and the second photodetector can be disposed on respectively opposite sides of the beam combiner. In some embodiments, the mirror is configured with a wavelength-variable reflectivity profile that is selected based on a wavelength response of the first photodetector. In some embodiments, the wavelength-variable reflectivity profile of the mirror causes the weighted wavelength response of the combination of the mirror and the first photodetector to be substantially flat (e.g., with equal or substantially equal responses for all wavelengths of light or, at least, for the wavelengths of light included in the aggregate laser light beam).

In some embodiments, a primary index substrate and a secondary index substrate of the beam combiner are disposed together to form a single pickoff interface that redirects a portion of the aggregate laser light beam toward a photodetector via Fresnel reflection. In some such embodiments, the secondary index substrate is located at an end of the beam combiner through which the aggregate laser light beam exits the beam combiner.

In some embodiments, the beam combiner includes alternating primary index substrates and secondary index substrates, such that multiple pickoff interfaces are formed between the primary index substrates and secondary index substrates, with each pickoff interface redirecting laser light beams toward a respectively different photodetector via Fresnel reflection. In some such embodiments, at least one of the multiple pickoff interfaces combines at least two of the laser light beams output by the modulatable laser light sources as part of forming the aggregate laser light beams while also redirecting a portion of at least one of the laser light beams toward a photodetector associated with (e.g., aligned with) that pickoff interface via Fresnel reflection.

It should be noted that, although some embodiments of the present disclosure are described and illustrated with reference to a particular example near-eye display system in the form of a wearable-heads-up display (WHUD), it will be appreciated that the apparatuses and techniques of the present disclosure are not limited to this particular example, but instead may be implemented in any of a variety of display systems using the guidelines provided herein.

FIG. 1 illustrates an example display system 100 employing a scanning-based optical system in accordance with some embodiments having support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a near-eye display system in the form of a WHUD in which the support structure 102 is configured to be worn on the head of a user and has a general shape and appearance (that is, form factor) of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1. It should be understood that instances of the term "or" herein refer to the non-exclusive definition of "or", unless noted otherwise. For example, herein the phrase "X or Y" means "either X, or Y, or both".

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the laser projector is a digital light processing-based projector, a scanning laser projector, or any combination of a modulative light source such as a laser or one or more light-emitting diodes (LEDs) and a dynamic reflector mechanism such as one or more dynamic scanners or digital light processors. In some embodiments, the laser projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The laser projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The laser projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the display system includes an optical scanner that routes light via first and second scan mirrors and an optical relay disposed between the first and second scan mirrors into a waveguide disposed at the output of the second scan mirror. In some embodiments, at least a portion of an outcoupler of the waveguide may overlap the FOV area 106. These aspects are described in greater detail below.

Figure 2:
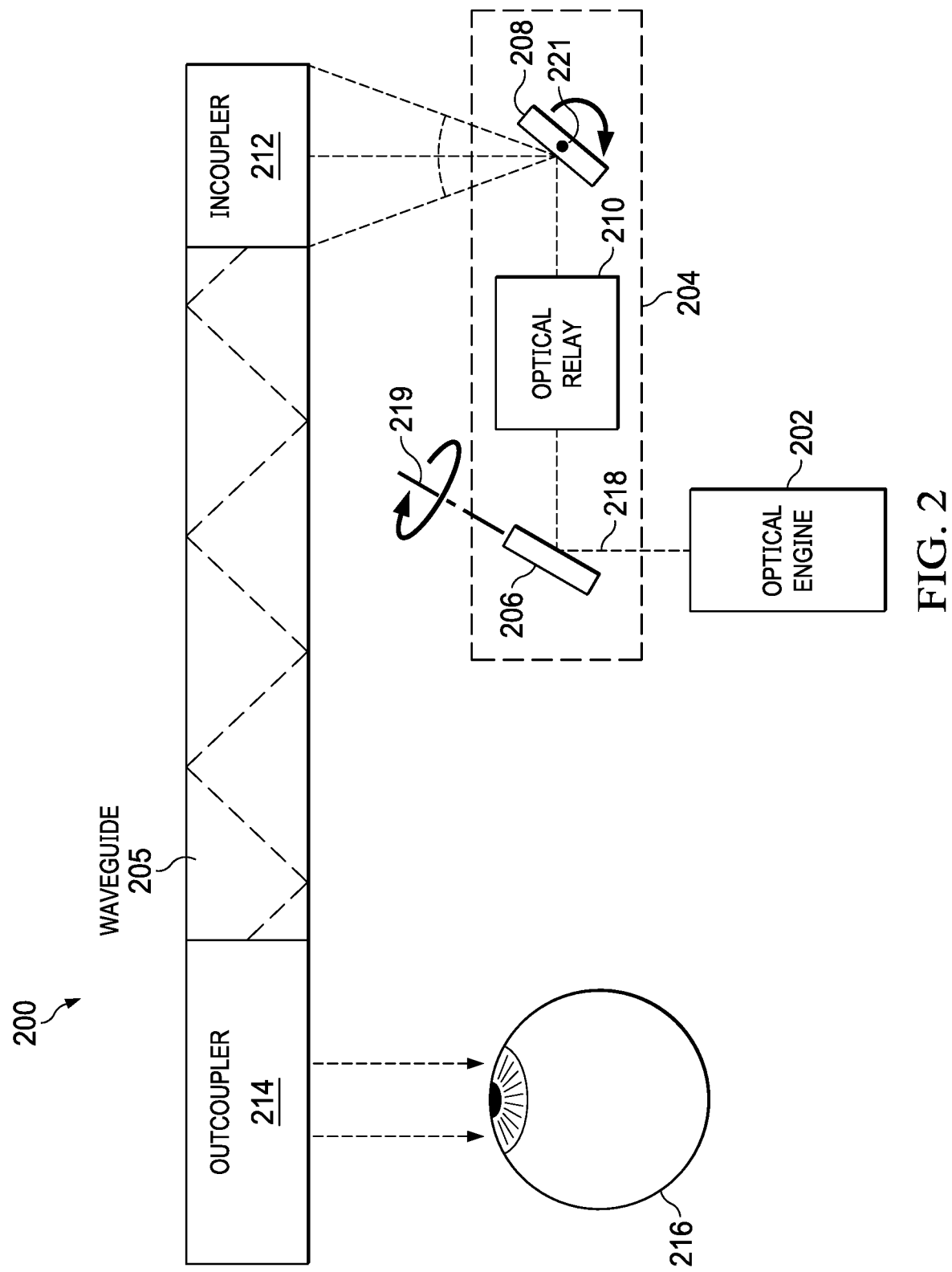
FIG. 2 is a diagram illustrating a laser projection system having an optical scanner that includes an optical relay disposed between two scan mirrors, in accordance with some embodiments.

FIG. 2 illustrates a simplified block diagram of a laser projection system 200 (sometimes referred to as a "laser projector") that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a wearable heads-up display or another display system, such as the display system 100 of FIG. 1.

The optical engine 202 includes one or more laser light sources configured to generate and output laser light 218 (e.g., visible laser light such as red, blue, and green laser light and, in some embodiments, non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the first and second scan mirrors 206 and 208 of the optical scanner 204 are MEMS mirrors in some embodiments. For example, the first scan mirror 206 and the second scan mirror 208 are MEMS mirrors that are driven by respective actuation voltages to oscillate during active operation of the laser projection system 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension (i.e., in a line) across the surface of the second scan mirror 208. In some embodiments, the second scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208. Herein, a "pupil plane" refers to a location along the optical path of laser light through an optical system where the laser light converges to an aperture along one or more dimensions. For example, the optical relay 210 may be associated with one or more entrance pupil planes located along the optical path of laser light through the optical system where the laser light converges to a virtual aperture before entering the optical relay 210. For example, the optical relay 210 may be associated with one or more exit pupil planes located along the optical path of laser light through the optical system where the laser light converges to a virtual aperture along one or more dimensions after exiting the optical relay 210.

According to various embodiments, the optical relay 210 includes one or more spherical, aspheric, parabolic, or freeform lenses that shape and relay the laser light 218 on the second scan mirror 208 or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil plane of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to reshape (e.g., circularize) the laser light 218 prior to the convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Figure 3:
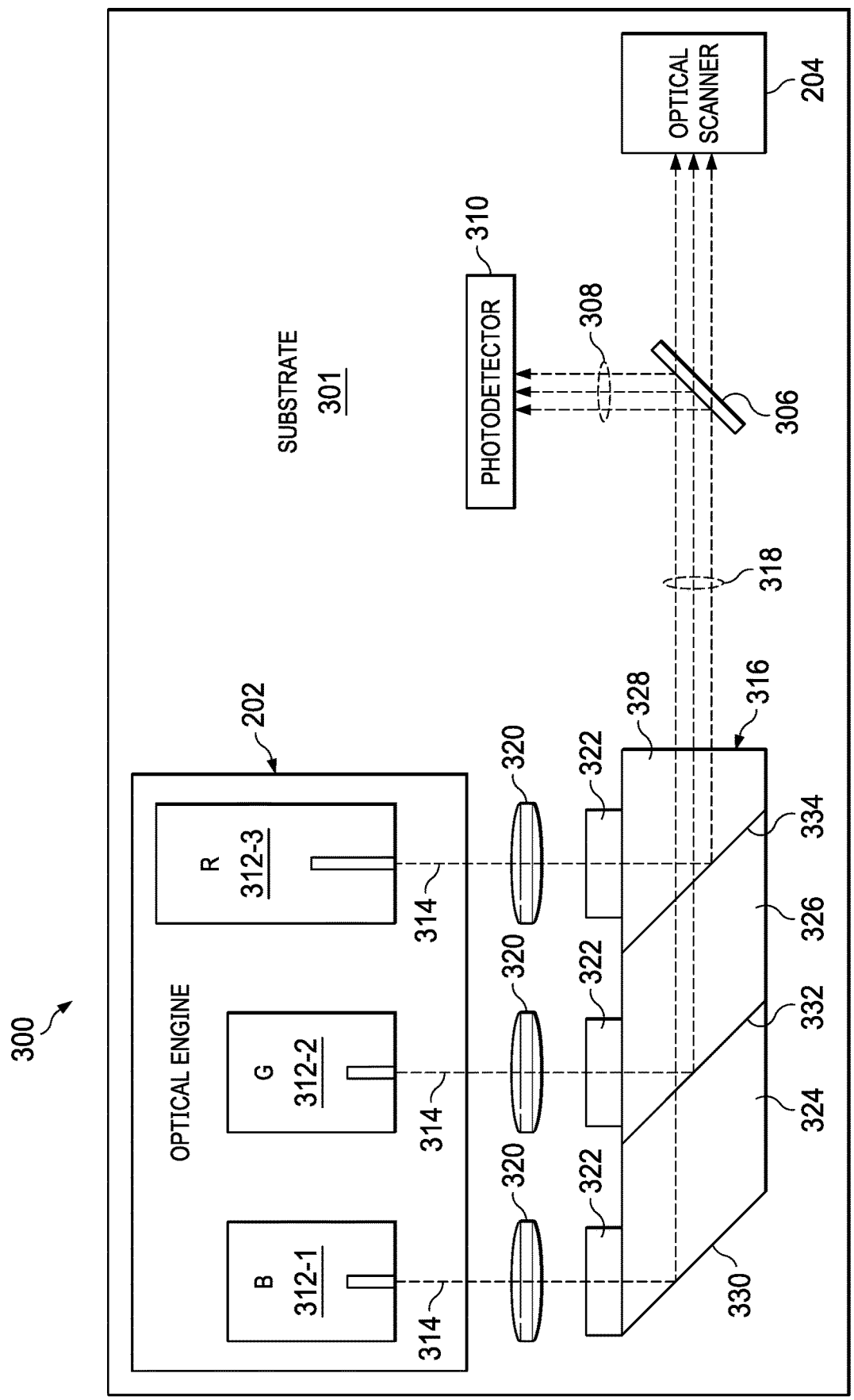
FIG. 3 is a diagram illustrating a perspective view of a laser projector that includes a discrete pickoff component for redirecting a portion of laser light to a photodetector via Fresnel reflection, in accordance with some embodiments.

Although not shown in the example of FIG. 2, in some embodiments additional optical components are included in any of the optical paths between the optical engine 202 and the first scan mirror 206, between the first scan mirror 206 and the optical relay 210, between the optical relay 210 and the second scan mirror 208, between the second scan mirror 208 and the incoupler 212, between the incoupler 212 and the outcoupler 214, or between the outcoupler 214 and the eye 216 (e.g., in order to shape the laser light for viewing by the eye 216 of the user). In some embodiments, a prism is used to steer light from the second scan mirror 208 into the incoupler 212 so that light is coupled into incoupler 212 at the appropriate angle to encourage propagation of the light in waveguide 205 by TIR. Also, in some embodiments, an exit pupil expander such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user). In some embodiments, a pick FIG. 3 shows an illustrative block diagram of a laser projector 300 that utilizes a pickoff element 306 (shown here to be a plate beamsplitter, though a cube beamsplitter could instead be use in alternate embodiments) to redirect laser light to a photodetector (PD) 310 via Fresnel reflection. In the present example, like reference numerals are used to refer to like elements introduced in any of the preceding examples, and some aspects or functions of such elements may not be repeated here for the sake of brevity.

The laser projector 300 includes an optical engine 202 that includes blue (B), green (G), and red (R), laser sources 312-1, 312-2, and 312-3, which output respective laser light beams 314. The laser light beams 314 are collimated via collimation lenses 320, then combined into an aggregate laser light beam 318 via a beam combiner 316. The beam combiner 316 comprises a first substrate 324, a second substrate 326, and a third substrate 328. In some embodiments, each of the first substrate 324, second substrate 326, and third substrate 328, are each formed, at least in part, from N-BK7 Borosilicate Crown glass, fused silica, crown glass, flint glass, sapphire, diamond, Barium Fluoride, Calcium Fluoride, or another applicable optically transmissive material.

A first interface 330 is disposed at a first end of the beam combiner 316. In some embodiments, a first coating is applied at the first interface 330 (e.g., is applied to a surface of the first substrate 324 that acts as the first end of the beam combiner 316). In some embodiments, the first coating is reflective or substantially reflective to all wavelengths of light. In some embodiments, the first coating (e.g., a first dichroic reflector coating or thin-film) is reflective or substantially reflective to only blue wavelengths of light, which include the wavelength of the laser light beam 314 output by the blue laser source 312-1, and is transmissive or substantially transmissive to other wavelengths of light. In some embodiments, the first coating is a broadband reflective coating configured to reflect a broad spectrum of light (e.g., including one or more of the blue, green, and red wavelengths of light output by the blue laser source 312-1, the green laser source 312-2, and the red laser source 312-3). In some embodiments, the first interface 330 is uncoated and reflects light via TIR. The first interface 330 receives the laser light beam 314 output by the blue laser source 312-1 and reflects it down the length of the beam combiner 316 toward a second end of the beam combiner 316 and toward the optical scanner 204.

A second interface 332 is an interface between the first substrate 324 and the second substrate 326. In some embodiments, a second coating is applied at the second interface 332 between the first substrate 324 and the second substrate 326. In some embodiments, the second coating (e.g., a second dichroic reflector coating or thin-film) is reflective or substantially reflective to only green wavelengths of light, which include the wavelength of the laser light beam 314 output by the green laser source 312-2, and is transmissive or substantially transmissive to other wavelengths of light including the blue wavelength of the laser light beam 314 output by the blue laser source 312-1. The second interface 332 receives the laser light beam 314 output by the green laser source 312-2 and reflects it down the length of the beam combiner 316 toward the second end of the beam combiner 316 and toward the optical scanner 204. The second interface 332 also receives the laser light beam 314 output by the blue laser source 312-1, having previously been reflected at the first interface 330, and passes it without reflection.

A third interface 334 is an interface between the second substrate 326 and the third substrate 328. In some embodiments, a third coating is applied at the third interface 334 between the second substrate 326 and the third substrate 328. In some embodiments, the third coating (e.g., a third dichroic reflector coating or thin-film) is reflective or substantially reflective to only red wavelengths of light, which include the wavelength of the laser light beam 314 output by the red laser source 312-3, and is transmissive or substantially transmissive to other wavelengths of light including the blue wavelength of the laser light beam 314 output by the blue laser source 312-1 and the green wavelength of the laser light beam 314 output by the green laser source 312-2. The third interface 334 receives the laser light beam 314 output by the red laser source 312-3 and reflects it down the length of the beam combiner 316 toward the second end of the beam combiner 316 and toward the optical scanner 204. The third interface 334 also receives the laser light beam 314 output by the blue laser source 312-1, having previously been reflected at the first interface 330, and the laser light beam 314 output by the green laser source 312-2 and passes both without reflection.

In some embodiments, one or more waveplates 322 are disposed at one or more inputs of the beam combiner 316 in the optical path or paths of one or more of the laser light beams 314. The waveplates 322 alter the polarization of light, such as the laser light beams 314, that passes through the waveplates. For example, the waveplates can change the polarization state of the laser light beams 314 to an S-polarization state or a P-polarization state.

After the laser light beams 314 are combined via the beam combiner 316, the aggregate laser light beam 318 is directed to the optical scanner 204, which scans the aggregate laser light beam 318 into a waveguide (e.g., an embodiment of the waveguide 205 of FIG. 2) for subsequent projection. For example, the waveguide can project the aggregate laser light beam onto a display area of an object, such as the lens of a WHUD, or directly toward an eye of a user, so that an image or video represented in the aggregate laser light beam 318 can be viewed by a user.

The aggregate laser light beam 318 passes through a pickoff element 306 after being output by the beam combiner 316. That is, the pickoff element 306 is disposed in the optical path of the aggregate laser light beam 318 between the beam combiner 316 and the optical scanner 204. The pickoff element 306 redirects light 308 (sometimes referred to herein as "redirected light 308"), which is a portion of the aggregate laser light beam 318, to the photodetector 310, which measures the intensity of the redirected laser light 308. The measured light intensity is then used to calculate and monitor the laser output power of the optical engine 202. In some embodiments, the pickoff element 306 includes first and second surfaces through which the aggregate laser light beam 318 passes, where each of the first and second surfaces is uncoated and planar or substantially planar. In some embodiments, the pickoff element 306 includes a first surface that is uncoated and planar or substantially planar and a second surface that is planar or substantially planar and that includes an anti-reflective coating, where the aggregate laser light beam 318 passes through each of the first and second surfaces. According to various embodiments, some or all of the optical engine 202, optical scanner 204, pickoff element 306, and photodetector 310 are disposed on a substrate 301, which may be a printed circuit board (PCB), for example.

As described previously, conventionally, laser light in a given system is sampled or "picked off" by using a pickoff optic having a dielectric coating to redirect a percentage of the laser light to a sensor. However, such conventional approaches that rely on pickoff optics having reflective dielectric coatings are typically narrow-band and have an undesirably large tolerance range for the amount of light that is redirected to the sensor. For example, in some cases, the transmittance tolerance for a dielectric-coating-based pickoff optic ranges from 97% to 99.5% transmittance, such that the amount of light that would be redirected to the sensor would be from 0.5% to 3% of the total light. That is, the maximum intensity of the portion of laser light redirected to the sensor would be about six times the minimum intensity of the portion of the laser light redirected to the sensor in such cases. Such a large range between maximum and minimum intensities of laser light to be received by a sensor is problematic to ensuring sufficient sensor sensitivity in the minimum intensity case and avoiding oversaturation of the sensor in the maximum intensity case.

Instead of applying a specific dielectric coating to an optical surface in order to pick off a portion of a laser light beam, systems and techniques described herein redirect light via Fresnel reflection at an interface between two materials having respectively different indices of refraction. For example, given an interface between air and a substantially flat optical surface (e.g., plano optic surface) of the pickoff element 306 formed from N-BK7 Borosilicate Crown glass, the percentage of the aggregate laser light beam 318 that is redirected via Fresnel reflection as redirected light 308 is shown in Table 1, below.

TABLE 1

Percentage of Light Redirected by Interface between Air and N-BK7 Borosilicate Crown Glass via Fresnel Reflection given a 45° Angle of Incidence

| Polarization | Redirected Light (% of Input) | | | Signal Range |
|---|---|---|---|---|
| | n = 1.5163 | n = 1.5168 | n = 1.5173 | |
| S-Polarization | 9.586% | 9.598% | 9.610% | 0.024% |
| P-Polarization | 0.919% | 0.921% | 0.923% | 0.004% |

N-BK7 Borosilicate Crown glass typically has an average refractive index, "n", of about 1.5168, with a typical tolerance range of about +/−0.0005. In the present example, it is assumed that this typical tolerance range defines upper and lower bounds of possible indices of refraction of the N-BK7 Borosilicate Crown glass. Table 1 shows, for both S-polarized and P-polarized light, the percentage of the aggregate laser light beam 318 that is redirected toward the photodetector 310 as redirected light 308 for the average (n=1.5168), upper-bound (n=1.5173), and lower-bound (n=1.5163) indices of refraction of N-BK7 Borosilicate Crown glass. As shown, the differences in the percentage of redirected light for both S-polarized and P-polarized light are each relatively small compared to those of dielectric-coating-based pickoff optics, described above. Additionally, the ratio of the lowest percentage of redirected light (i.e., for the lower-bound index of refraction) to the highest percentage of redirected light (i.e., for the upper-bound index of refraction) in the present example is about 1.0025 for S-polarized light and about 1.0044 for P-polarized light. Accordingly, even accounting for typical variations in the index of refraction of N-BK7 Borosilicate Crown glass, the percentage of input light redirected by an interface between N-BK7 Borosilicate Crown glass via Fresnel reflection is more consistent than the percentage of input light redirected using conventional dielectric-coating-based pickoff optics. This improved consistency in the percentage of the input light (the aggregate laser light beam 318, in the present example) that is redirected to the photodetector 310, mitigates issues with ensuring sufficient photodetector sensitivity for lower-bound cases and with avoiding over-saturation of the photodetector in upper-bound cases compared with conventional methods. It should be noted that, while an embodiment of the pickoff element 306 that includes an interface between air and N-BK7 Borosilicate Crown glass is considered in the present example, consistencies in the range of the percentage of light redirected by interfaces between air and other materials or between two other materials with different indices of refraction are expected to be better than those typically achievable by conventional dielectric-coating-based pickoff optics. For example, such other materials include fused silica, crown glass, and flint glass, sapphire, diamond, Barium Fluoride, Calcium Fluoride. According to various alternate embodiments, the pickoff element 306 includes or is made entirely from any of the other materials listed above.

Figure 4:
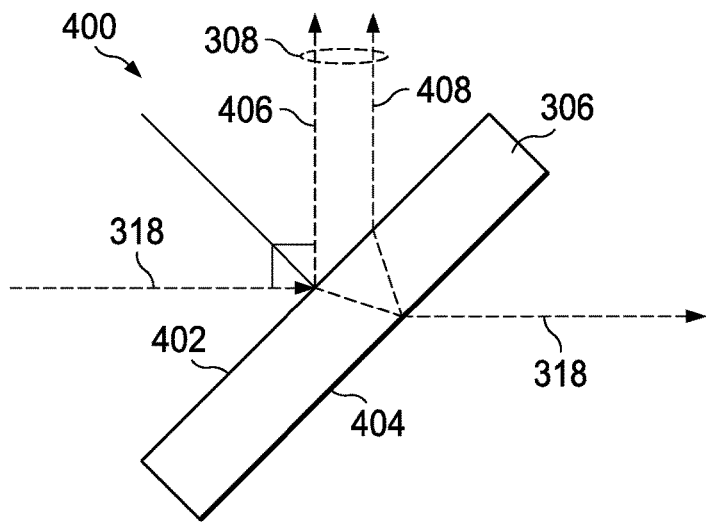
FIG. 4 is a diagram illustrating an example of the redirection, via Fresnel reflection, of a portion of the light of one or more laser light beams passing through a discrete pickoff component, in accordance with some embodiments.

FIG. 4 is a diagram showing a perspective view of an embodiment of the pickoff element 306 of FIG. 3 and illustrating how light is redirected via Fresnel reflection off of first and second surfaces of the pickoff element 306. In the present example, like reference numerals are used to refer to like elements introduced in any of the preceding examples, and some aspects or functions of such elements may not be repeated here for the sake of brevity.

As illustrated, the incoming aggregate light beam 318, shown here via a single dashed line though including three or more combined laser light beams such as the laser light beams 314 of FIG. 3, is incident upon a first surface 402, and a first portion 406 of the aggregate light beam 318 is redirected as part of the redirected light 308 due to a first Fresnel reflection occurring at an interface at the first surface 402 between the material of the pickoff element 306 and air. The first Fresnel reflection is caused by a difference between the respective indices of refraction of air and the material of the pickoff element 306 at the first surface 402. The remainder of the aggregate laser light beam 318 continues on to pass through the pickoff element 306. When the aggregate laser light beam 318 passes through a second surface 404 of the pickoff element 306, a second Fresnel reflection occurs due to the difference between the respective indices of refraction of air and the material of the pickoff element 306 at the second surface 404. This second Fresnel reflection causes a second portion 408 of the aggregate laser light beam 318 to be redirected back into the pickoff element 306 and to exit through the first surface 402 as part of the redirected light 308. The remainder of the aggregate laser light beam 318 then passes out of the pickoff element 306 (then proceeding toward the optical scanner 204, for example). In some embodiments, the first Fresnel reflection or the second Fresnel reflection is prevented by applying an antireflective coating to either the first surface 402 or the second surface 404 of the pickoff element 306. Otherwise, both the first and second surfaces 402 and 404 of the pickoff element 306 are uncoated.

Figure 5:
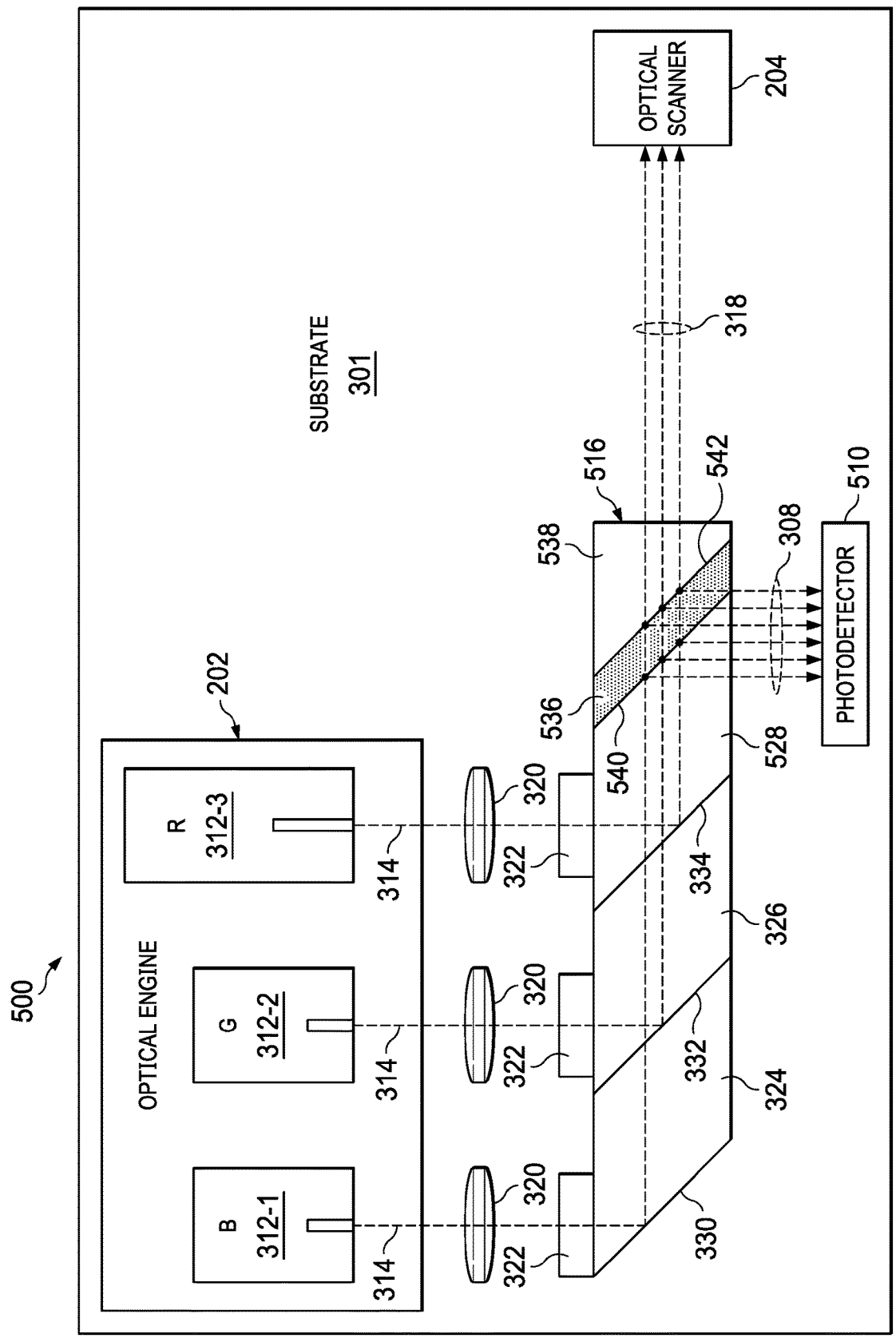
FIG. 5 is a diagram illustrating a perspective view of a laser projector having a beam combiner that includes a secondary index substrate interposed between two primary index substrates, the primary index substrates each having a first index of refraction and the secondary index substrate having a second index of refraction, where the difference between the first index of refraction and the second index of refraction causes laser light beams to be partially reflected at interfaces between the primary index substrates and the secondary index substrate toward a photodetector, in accordance with some embodiments.

In some embodiments, rather than using a discrete pickoff element, such as the pickoff element 306 of FIG. 3, to redirect laser light toward a photodetector, a modified beam combiner is provided having one or more interfaces between differently indexed materials (i.e., materials having different respective indices of refraction), resulting in Fresnel reflections of portions of the incoming laser light beams at such interfaces that cause the portions of the incoming laser light beams to be redirected toward one or more photodetectors. FIG. 5 shows an illustrative block diagram of a laser projector 500 that includes a beam combiner having first and second pickoff interfaces 540 and 542 between first and second primary index substrates 528 and 538 and a secondary index substrate 536. Each of the first and second primary index substrates 528 and 538 are at least partly formed from a first material having a first index of refraction, while the secondary index substrate 536 is formed from a second material having a second index of refraction that is different from the first index of refraction. The first pickoff interface 540 and the second pickoff interface 542 each redirect a portion of the aggregate laser light beam 318 toward a photodetector 510 disposed at a first side of the beam combiner 516. In the present example, like reference numerals are used to refer to like elements introduced in any of the preceding examples, and some aspects or functions of such elements may not be repeated here for the sake of brevity.

In the present example, the secondary index substrate 536 is disposed so as to be interposed between the first and second primary index substrates 528 and 538, resulting in the first pickoff interface 540 that is the interface between the first primary index substrate 528 and the secondary index substrate 536 and the second pickoff interface 542 that is the interface between the second primary index substrate 538 and the secondary index substrate 536. As the aggregate laser light beam 318 passes through the first pickoff interface 540, a first Fresnel reflection occurs due to the difference in indices of refraction between the first primary index substrate 528 and the secondary index substrate 536, which redirects a portion of the aggregate laser light beam 318 toward the photodetector 510. As the aggregate laser light beam 318 passes through the second pickoff interface 542, a second Fresnel reflection occurs due to the difference in indices of refraction between the second primary index substrate 538 and the secondary index substrate 536, which redirects a portion of the aggregate laser light beam 318 toward the photodetector 510. It should be noted that the first Fresnel reflection can effectively be considered three separate Fresnel reflections, one for each of the three laser light beams 314 comprised by the aggregate laser light beam 318. As illustrated in Table 2, below, the percentage of light redirected by a given one of the first and second pickoff interfaces 540 and 542 varies based on the indices of refraction of the first material and the second material that form the given interface.

TABLE 2

Percentage of Light Redirected by Interface between N-BK7 Borosilicate Crown Glass and Various Materials via Fresnel Reflection given a 45° Angle of Incidence

| | Redirected Light (% of Input) | | | |
|---|---|---|---|---|
| Polarization | Fused Silica n = 1.4585 | Crown Glass n = 1.5111 | Flint Glass n = 1.6200 | Sapphire n = 1.770 |
| S-Polarization | 0.167% | 0.0014% | 0.383% | 1.829% |
| P-Polarization | 0.0003% | 2.04 e−08% | 0.0015% | 0.033% |

The example of Table 2 provides percentage of input light that is redirected by a given one of the first pickoff interface 540 and the second pickoff interface 542, where the first and second primary index substrates 528 and 538 are formed from N-BK7 Borosilicate Crown Glass and the secondary index substrate 536 is formed from one of the listed materials (fused silica, crown glass, flint glass, sapphire) corresponding to each entry. The index of refraction of N-BK7 Borosilicate Crown Glass is considered to be n=1.5168 in Table 2. As illustrated in Table 2, the amount of light redirected via Fresnel reflection at a given interface between two materials having respectively different indices of refraction is proportional to the difference between the indices of refraction of the two materials.

As can be seen from comparing Table 1 and Table 2, the difference in the indices of refraction between air and N-BK7 Borosilicate Crown Glass (or, for that matter, any of the materials listed in Table 2) is comparatively larger than the difference in the indices of refraction between N-BK7 Borosilicate Crown Glass and any of the materials listed in Table 2. Accordingly, in some alternate embodiments an airgap is included in the beam combiner 516 in place of the secondary index substrate 536, which causes a comparatively larger percentage of the aggregate laser light beam 318 to be redirected to the photodetector 510 as part of the redirected light 308, regardless of whether the aggregate laser light beam 318 is P-polarized or S-polarized. While the present example involves redirecting light via Fresnel reflection between substrates having different indices of refraction, it should be understood that in alternate embodiments one or more optical adhesive layers may be disposed at either or both of the first and second pickoff interfaces 540 and 542, where the optical adhesive layers have respective indices of refraction that differ from the respective first and second indices of refraction of the primary and secondary index substrates 528, 538, and 536, which cause Fresnel reflection to occur between the optical adhesive layers any of the primary and secondary index substrates 528, 538, and 536 that are in physical contact with the optical adhesive layers.

Figure 6:
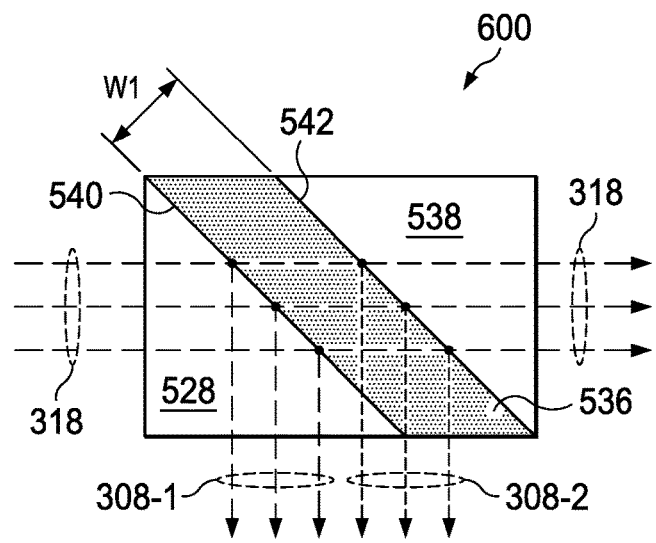
FIG. 6 is a diagram illustrating an example in which a thickness of the secondary index substrate of FIG. 5 is such that first and second sets of laser light beams reflected at the input and output interfaces of the secondary index substrate are non-overlapping, in accordance with some embodiments.
Figure 7:
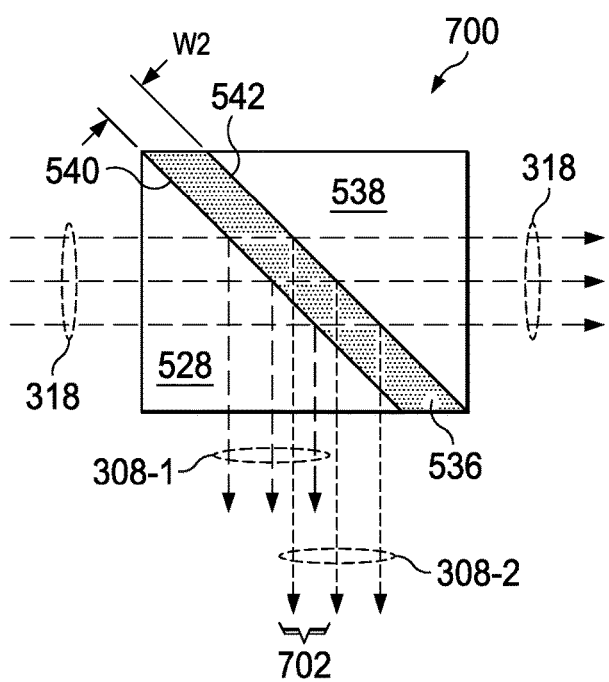
FIG. 7 is a diagram illustrating an example in which a thickness of the secondary index substrate of FIG. 5 is such that first and second sets of laser light beams reflected at the input and output interfaces of the secondary index substrate are partially overlapping, in accordance with some embodiments.

FIGS. 6 and 7 illustrate that a width (i.e., the width spanning from the first primary index substrate 528 to the second primary index substrate 538) of the secondary index substrate 536 determines whether the portion (i.e., the "first portion") of the aggregate laser light beam 318 that is redirected by the first pickoff interface 540 overlaps the portion (i.e., the "second portion") of the aggregate laser light beam 318 that is redirected by the second pickoff interface 542.

FIG. 6 shows a perspective view 600 of a portion of an embodiment of the beam combiner 516 of FIG. 5 in which a secondary index substrate 536 is included having a width W1. In the present example, like reference numerals are used to refer to like elements introduced in any of the preceding examples, and some aspects or functions of such elements may not be repeated here for the sake of brevity.

As shown, the width W1 of the secondary index substrate 536 is sufficiently large such that a first portion 308-1 of the redirected light 308 that is redirected by the first pickoff interface 540 travels along a first optical path, a second portion 308-2 of the redirected light 308 that is redirected by the second pickoff interface 542 travels along a second optical path, and the first optical path does not overlap the second optical path. In some applications, it is undesirable for the first portion 308-1 and the second portion 308-2 to overlap, as this creates an additive effect with respect to how the intensities of the light of the first portion 308-1 and the light of the second portion 308-2 are detected by the photodetector (e.g., the photodetector 510). That is, in a given area in which overlapping light from the first and second portions 308-1 and 308-2 are incident on the photodetector, the photodetector will detect a light intensity that is a combination of the respective light intensities the overlapping first and second portions 308-1 and 308-2. By providing a secondary index substrate 536 with a sufficiently large width, such as the width W1, the first optical path of the first portion 308-1 and the second optical path of the second portion 308-2 are non-overlapping, and the aforementioned additive effects associated with overlapping are avoided.

FIG. 7 shows a perspective view 700 of a portion of an embodiment of the beam combiner 516 of FIG. 5 in which a secondary index substrate 536 is included having a width W2. In the present example, like reference numerals are used to refer to like elements introduced in any of the preceding examples, and some aspects or functions of such elements may not be repeated here for the sake of brevity.

As shown, the width W2 of the secondary index substrate 536 is sufficiently large such that a first portion 308-1 of the redirected light 308 that is redirected by the first pickoff interface 540 travels along a first optical path, a second portion 308-2 of the redirected light 308 that is redirected by the second pickoff interface 542 travels along a second optical path, and the first optical path partially overlaps the second optical path. In some applications, it is desirable for the first portion 308-1 and the second portion 308-2 to overlap in order to boost the strength of the light provided to the photodetector (e.g., the photodetector 510) in the area where the overlapping light from the first and second portions 308-1 and 308-2 is incident, since the overlap causes the additive effect discussed above. By providing a secondary index substrate 536 with a sufficiently small width, such as the width W2, the first optical path of the first portion 308-1 and the second optical path of the second portion 308-2 are at least partially overlapping, and the aforementioned additive effects associated with such overlapping result in an increase in the intensity of light received at the photodetector.

Figure 8:
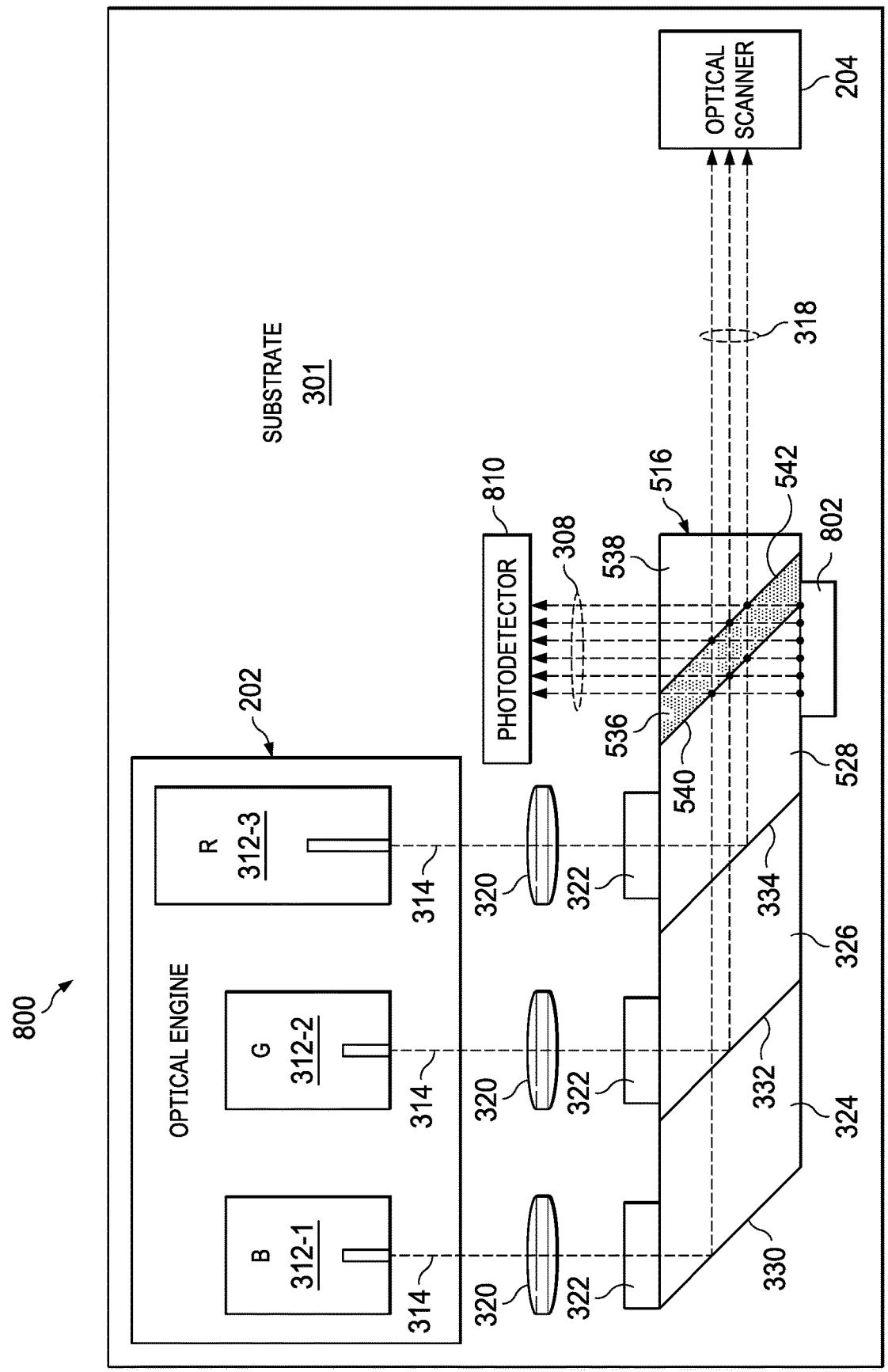
FIG. 8 is a diagram illustrating a perspective view of a laser projector having a beam combiner that includes a secondary index substrate interposed between two primary index substrates, with a mirror being disposed at a first side of the beam combiner to redirect laser light beams toward a photodetector at a second side of the beam combiner, in accordance with some embodiments.

FIG. 8 shows an illustrative block diagram of a laser projector 800, which includes a mirror 802 that is positioned at the first side of the beam combiner 516 to receive the redirected light 308 from Fresnel reflections off of first and second pickoff interfaces 540 and 542 and to reflect the redirected light 308 back through the beam combiner 516 toward a photodetector 810 disposed across from a second side of the beam combiner 516 that is opposite the first side. It should be noted that, aside from the inclusion of the mirror 802 and photodetector 810 and the removal of the photodetector 510, embodiments of the laser projector 800 are structurally similar to embodiments of the laser projector 500 of FIG. 5. In the present example, like reference numerals are used to refer to like elements introduced in any of the preceding examples, and some aspects or functions of such elements may not be repeated here for the sake of brevity.

In some embodiments, the mirror 802 is a reflective coating that is applied to a first surface of the beam combiner 516 that is disposed at the first side of the beam combiner 516. In accordance with various embodiments, the mirror 802 is a discrete optical element that is attached to, abutted against, or disposed adjacent to the first surface of the beam combiner 516 in the optical path of the redirected light 308. In some embodiments, the mirror 802 is flat. In some embodiments, the mirror 802 is curved. In some embodiments, in addition to reflection, the mirror 802 performs one or more optical functions (such optical functions being the result of one or more diffuser elements, gratings, metasurfaces, or the like included in the mirror 802) on received light. Such optical functions may be used to achieve a particular reflectivity profile of the mirror 802 to modify the way in which certain wavelengths of light are redirected toward the photodetector 810 in order to, for example, accommodate a response profile of the photodetector 810.

The redirected light 308 that is redirected from the aggregate laser light beam 318 via Fresnel reflection from the first and second pickoff interfaces 540 and 542 is incident upon the mirror 802 and is then reflected back through the beam combiner 516 (passing, for example, through some or all of the first primary index substrate 528, the second primary index substrate 538, and the secondary index substrate 536), exits a second surface of the beam combiner 516 (disposed on the second side of the beam combiner 516), then is received by the photodetector 810. Placement of the photodetector 810 across from the second side of the beam combiner 516 can advantageously reduce the form factor of the laser projector 800, as opposed to placing such a photodetector across from the first side of the beam combiner 516.

In some embodiments, the mirror 802 is fully reflective (i.e., no portion of the redirected light 308 passes through the mirror 802). In some embodiments the mirror 802 is only partially reflective, such that its reflectivity varies depending on the wavelength of light being reflected (characterized by a "wavelength-dependent reflectivity profile" of the mirror 802), as will be described in more detail below.

Figure 9:
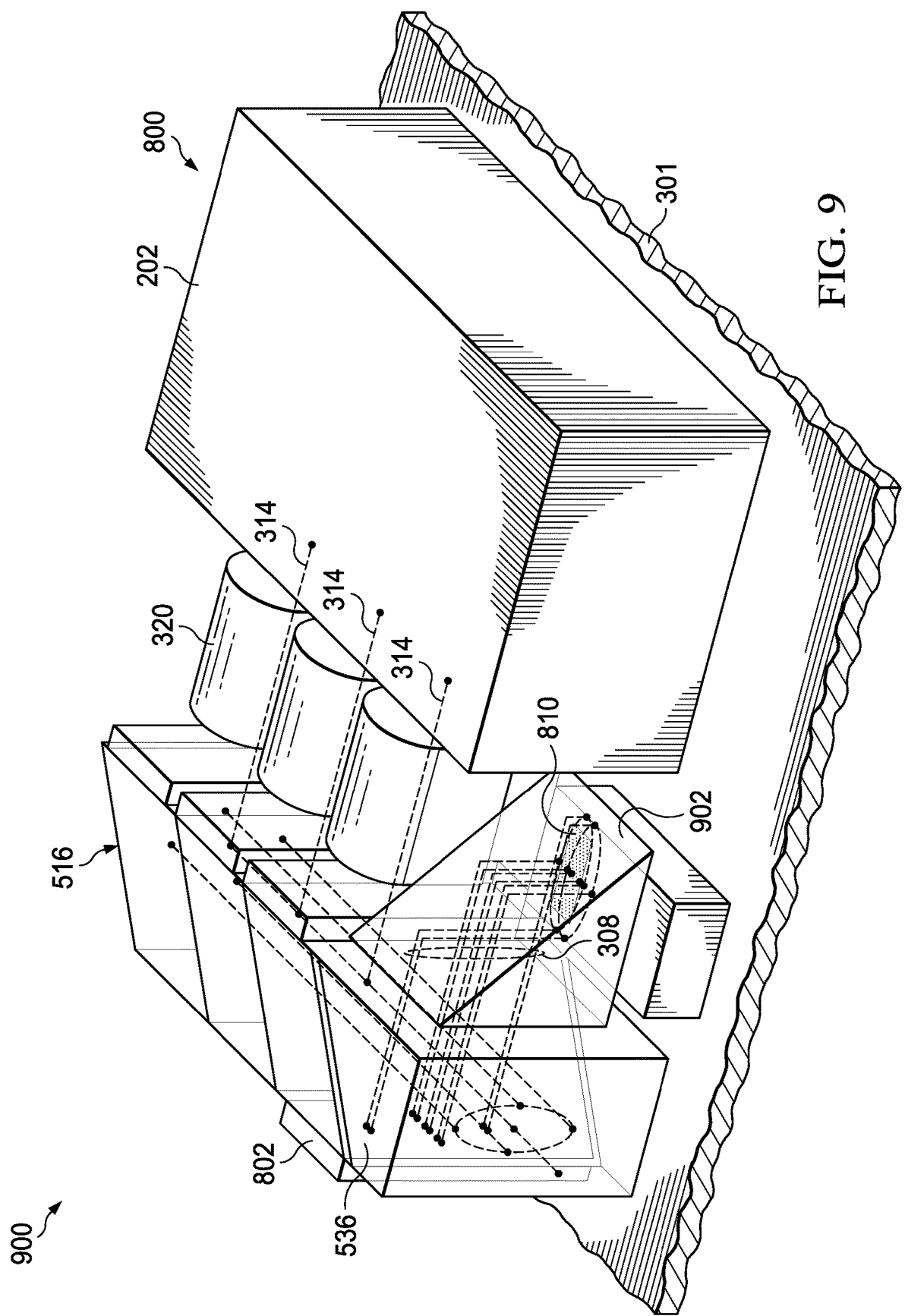
FIG. 9 is a diagram illustrating a perspective view of a laser projector having a beam combiner that includes a secondary index substrate interposed between two primary index substrates, with a first mirror being disposed at a first side of the beam combiner to redirect laser light beams toward a photodetector and a second mirror being disposed at a second side of the beam combiner to redirect laser light beams toward a photodetector, in accordance with some embodiments.

FIG. 9 shows a perspective view 900 of an embodiment of the laser projector 800 of FIG. 8, in which the photodetector 810 is disposed facing a first direction, such that the optical path of the redirected light 308, after reflection by the mirror 802, is non-orthogonal with respect to the surface of the photodetector 810. In the present example, like reference numerals are used to refer to like elements introduced in any of the preceding examples, and some aspects or functions of such elements may not be repeated here for the sake of brevity.

In the present example, a mirror 902 is disposed at the second side of the beam combiner 516 and in the optical path of the redirected light 308. The mirror 902 is positioned such that the redirected light 308 is reflected toward the surface of the photodetector 810. In some embodiments, the photodetector 810 is disposed such that the surface of the photodetector 810 lies within a plane that is substantially parallel to the surface of the substrate 301 on which the photodetector 810 is disposed. Such an orientation of the photodetector 810 may reduce the complexity of electrical connections provided between the photodetector 810 and the substrate 301. The inclusion of the mirror 902 accommodates the depicted orientation of the photodetector 810, advantageously allowing for reduced complexity of the electrical connections between the photodetector 810 and the substrate 301.

Figure 10:
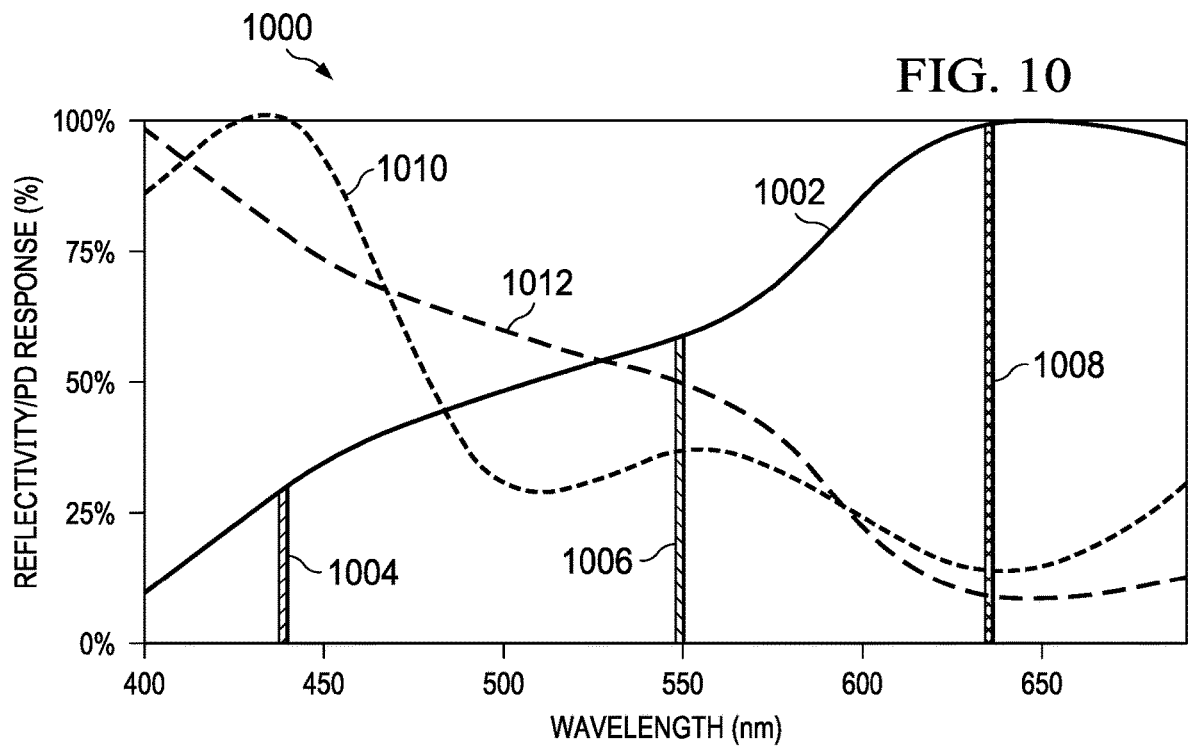
FIG. 10 is a chart illustrating a wavelength response of a photodetector, such as the photodetector of FIGS. 8 and 9, and respective wavelength-variable reflectivity profiles of first and second partially reflective mirrors, in accordance with some embodiments.

FIG. 10 shows an illustrative chart 1000 depicting an example response profile of an embodiment of the photodetector 810 of FIG. 8 and example wavelength-dependent reflectivity profiles of embodiments of the mirror 802 of FIG. 8. In the present example, like reference numerals are used to refer to like elements introduced in any of the preceding examples, and some aspects or functions of such elements may not be repeated here for the sake of brevity.

As shown, in the present example the photodetector 810 has a response profile 1002, such that higher wavelengths of light are more easily detected by the photodetector 810 than lower wavelengths of light. That is, higher wavelengths of light cause a greater magnitude of response by the photodetector 810 than lower wavelengths of light in the embodiment characterized by the response profile 1002. In the present example, a blue wavelength (about 441 nm) of the laser light beam 314 emitted by the blue laser source 312-1 is indicated by a first line 1004 relative to the response profile 1002, a green wavelength (about 550 nm) of the laser light beam 314 emitted by the green laser source 312-2 is indicated by a second line 1006 relative to the response profile 1002, and a red wavelength (about 638 nm) of the laser light beam 314 emitted by the red laser source 312-3 is indicated by a third line 1008 relative to the response profile 1002. While examples of blue, green, and red wavelengths are provided in the present example, it should be understood that the present embodiments are applicable to other wavelengths of light than those listed here, including infrared and ultraviolet wavelengths of light.

A first embodiment of the mirror 802 has a first wavelength-dependent reflectivity profile 1010, which provides about 100% reflectivity for light of the blue wavelength, about 35% reflectivity for light of the green wavelength, and about 15% reflectivity for light of the red wavelength. A second embodiment of the mirror 802 has a second wavelength-dependent reflectivity profile 1012, which provides about 75% reflectivity for light of the blue wavelength, about 50% reflectivity for light of the green wavelength, and about 10% reflectivity for light of the red wavelength.

As shown, each of the first and second wavelength-dependent reflectivity profiles 1010 and 1012 cause a greater percentage of the blue wavelength of light to be reflected toward the photodetector 810, relative to the percentages of the green and red wavelengths of light that are reflected. Each of the first and second wavelength-dependent reflectivity profiles 1010 and 1012 also cause a smaller percentage of the red wavelength of light to be reflected toward the photodetector 810, relative to the percentages of the blue and green wavelengths of light that are reflected. In this way, an embodiment of the mirror 802 having either of the first and second wavelength-dependent reflectivity profiles 1010 and 1012 will accommodate, at least in part, for the uneven response profile 1002 of the photodetector 810, effectively weighting the response of the photodetector 810 to provide a more even response to the redirected light 308.

Figure 11:
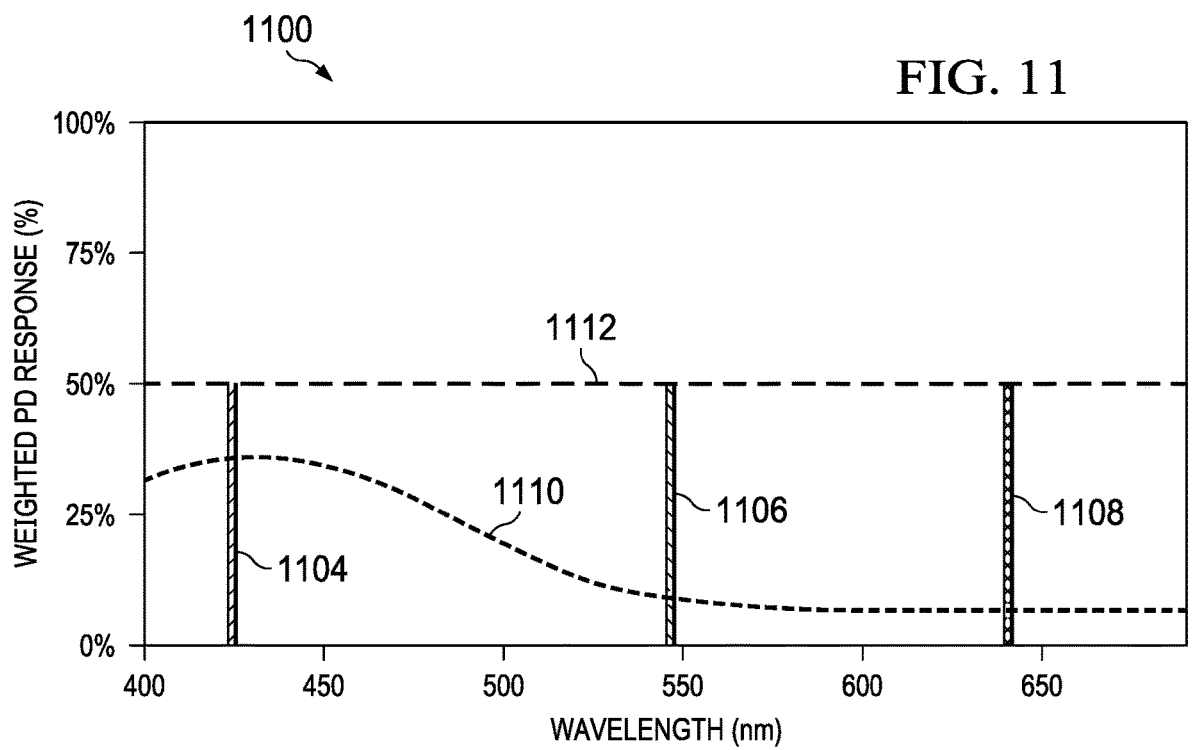
FIG. 11 is a chart illustrating a first weighted wavelength response of a combination of a first partially reflective mirror and a photodetector and a second weighted wavelength response of a combination of a second partially reflective mirror and the photodetector, in accordance with some embodiments.

FIG. 11 shows an illustrative chart 1100 depicting example weighted response profiles of embodiments of the photodetector 810 of FIG. 8 that are respectively weighted by reflecting the redirected light 308 using embodiments of the mirror 802 having respectively different wavelength-dependent reflectivity profiles. In the present example, like reference numerals are used to refer to like elements introduced in any of the preceding examples, and some aspects or functions of such elements may not be repeated here for the sake of brevity.

As a first example, a first weighted response of an embodiment of the photodetector 810 in combination with a first wavelength-dependent reflectivity profile of an embodiment of the mirror 802 is defined by a first weighted response profile 1112. In the present example, the combination of a first response profile (not shown) of an embodiment of the photodetector 810 and a first wavelength-dependent reflectivity profile (not shown) of an embodiment of the mirror 802 cause the combination of the photodetector 810 and the mirror 802 to have a substantially flat response (shown here to correspond to about 50% of the intensity of the light input at the mirror 802) across each of the blue, green, and red wavelengths of light, indicated here via lines 1104, 1106, and 1108, respectively. That is, the combination of the first response profile and the first wavelength-dependent reflectivity profile result in the first weighted response profile 1112 corresponding to a substantially normalized response across the blue, green, and red wavelengths of light. By providing embodiments of the mirror 802 and the photodetector 810 that, combined, have the first weighted response profile 1112, a system that includes a corresponding embodiment of the laser projector 800 can perform fewer, if any, subsequent calculations (when calculating laser output power of the laser projector 800, for example) to account for an uneven wavelength-response of the photodetector 810 due to its first response profile.

As a second example, a second weighted response of an embodiment of the photodetector 810 in combination with a second wavelength-dependent reflectivity profile of an embodiment of the mirror 802 is defined by a second weighted response profile 1110. The weighted response profile 1110 causes the photodetector 810 to primarily detect the blue wavelength of light of the redirected light 308. By weighting the response of the photodetector 810 using the wavelength-dependent reflectivity profile of the mirror 802 in this way, it is possible for a system that includes the laser projector 800 to determine, or at least approximate, based on the light intensity detected by the photodetector 810, the laser output power of a particular laser source of the optical engine 202 (e.g., the blue laser source 312-1, in the present example). In some embodiments, the weighted response profile of the combination of the photodetector 810 and the mirror 802 corresponds to a photopic luminosity function that corresponds to the perceived brightness sensitivity of the human eye.

Figure 12:
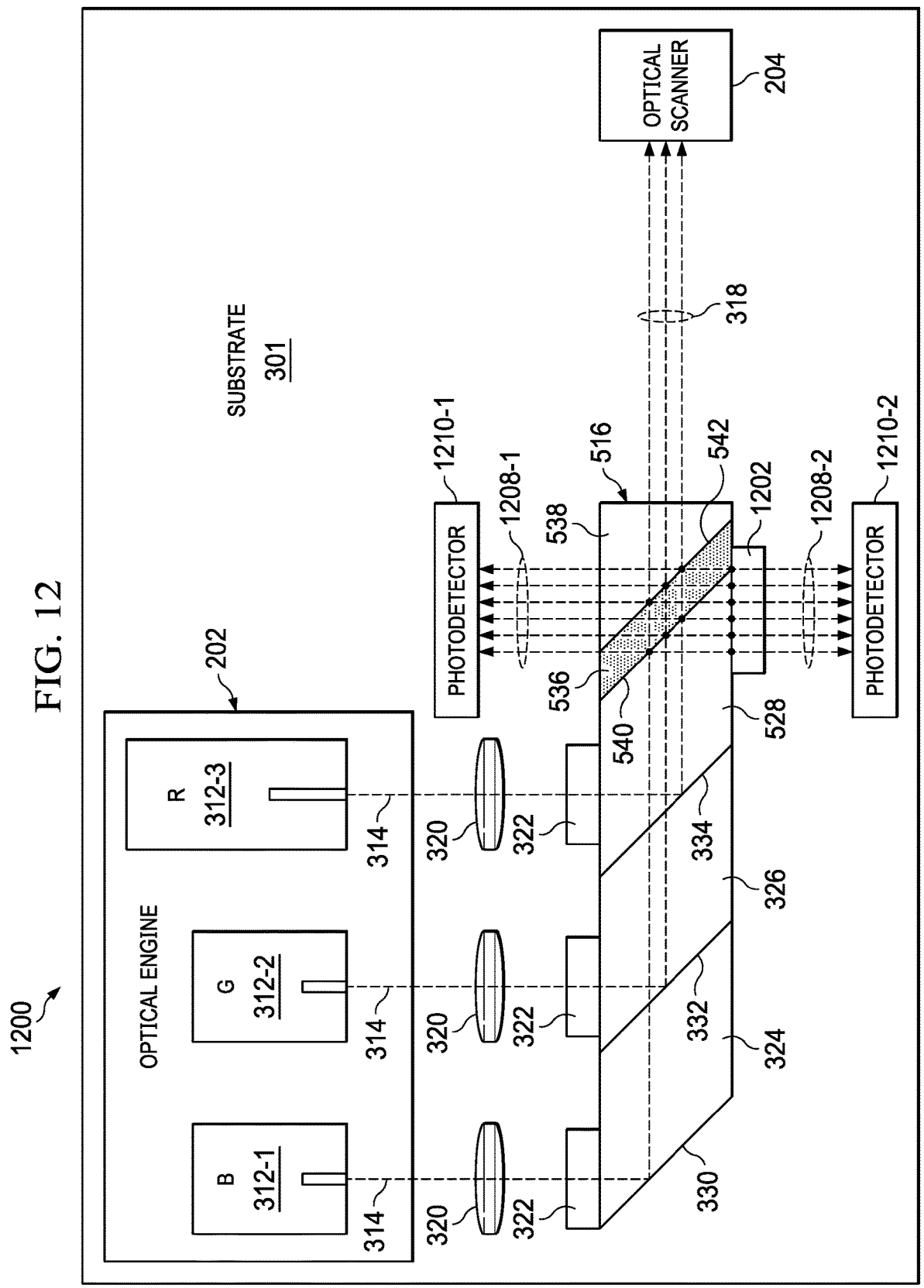
FIG. 12 is a diagram illustrating a perspective view of a laser projector having a beam combiner that includes a secondary index substrate interposed between two primary index substrates, with a first beam splitter being disposed at a first side of the beam combiner to redirect laser light beams toward a first photodetector at a second side of the beam combiner and to allow a portion of the laser light beams to pass through the first beam splitter toward a second photodetector at the first side of the beam combiner, in accordance with some embodiments.

FIG. 12 shows an illustrative block diagram of a laser projector 1200, which includes a mirror 1202 that is positioned at the first side of the beam combiner 516 to receive redirected light from Fresnel reflections off of first and second pickoff interfaces 540 and 542, to reflect first redirected light 1208-1 back through the beam combiner 516 toward a first photodetector 1210-1 disposed across from a second side of the beam combiner 516 that is opposite the first side, and to pass second redirected light 1208-2 to a second photodetector 1210-2 disposed across from the first side of the beam combiner 516. It should be noted that, aside from the inclusion of the second photodetector 1210-2, embodiments of the laser projector 1200 are structurally similar to some embodiments of the laser projector 800 of FIG. 8. In the present example, like reference numerals are used to refer to like elements introduced in any of the preceding examples, and some aspects or functions of such elements may not be repeated here for the sake of brevity.

In the present example, the mirror 1202 is partially transmissive and partially reflective, such that a first portion of the redirected light received at the mirror 1202 is reflected as the first redirected light 1208-1 and a second portion of the redirected light received at the mirror 1202 is passed through the mirror 1202 to a second photodetector 1210-2, which is disposed at the first side of the beam combiner 516. In some embodiments, the mirror 1202 has a non-uniform wavelength-dependent reflectivity profile, such as either of the wavelength-dependent reflectivity profiles 1010 and 1012 of FIG. 10, which effectively weights the respective response profiles of the first and second photodetectors 1210-1 and 1210-2. By including the second photodetector 1210-2 at the first side of the beam combiner 516, incoming light that is transmitted through, rather than reflected by, the mirror 1202 is able to be detected.

In some embodiments, the mirror 1202 is configured to be fully or substantially reflective to at least one wavelength of light included in the aggregate laser light beam 318 and fully or substantially transmissive to at least one other wavelength of light included in the aggregate laser light beam 318. In an example, the mirror 1202 is substantially reflective to red and green wavelengths of light corresponding to the wavelengths of the laser light beams 314 generated by the green laser source 312-2 and the red laser source 312-3, respectively and is substantially transmissive to a blue wavelength of light corresponding to the wavelength of the laser light beam 314 generated by the blue laser source 312-1, such that the first redirected light 1208-1 includes the red and green wavelengths of light and the second redirected light 1208-2 includes the blue wavelength of light. In this way, the first photodetector 1210-1 will detect only the intensity of red and green light output by the optical engine 202 and the second photodetector 1210-2 will detect only the intensity of the blue light output by the optical engine 202, such that the respective intensities of particular wavelengths of light can be independently measured. That is, in the present example, the combined laser output power of the green and red laser sources 312-2 and 312-3 is determined based on the light intensity detected by the first photodetector 1210-1 and the laser output power of the blue laser source 312-1 is separately determined based on the light intensity detected by the second photodetector 1210-2.

Figure 13:
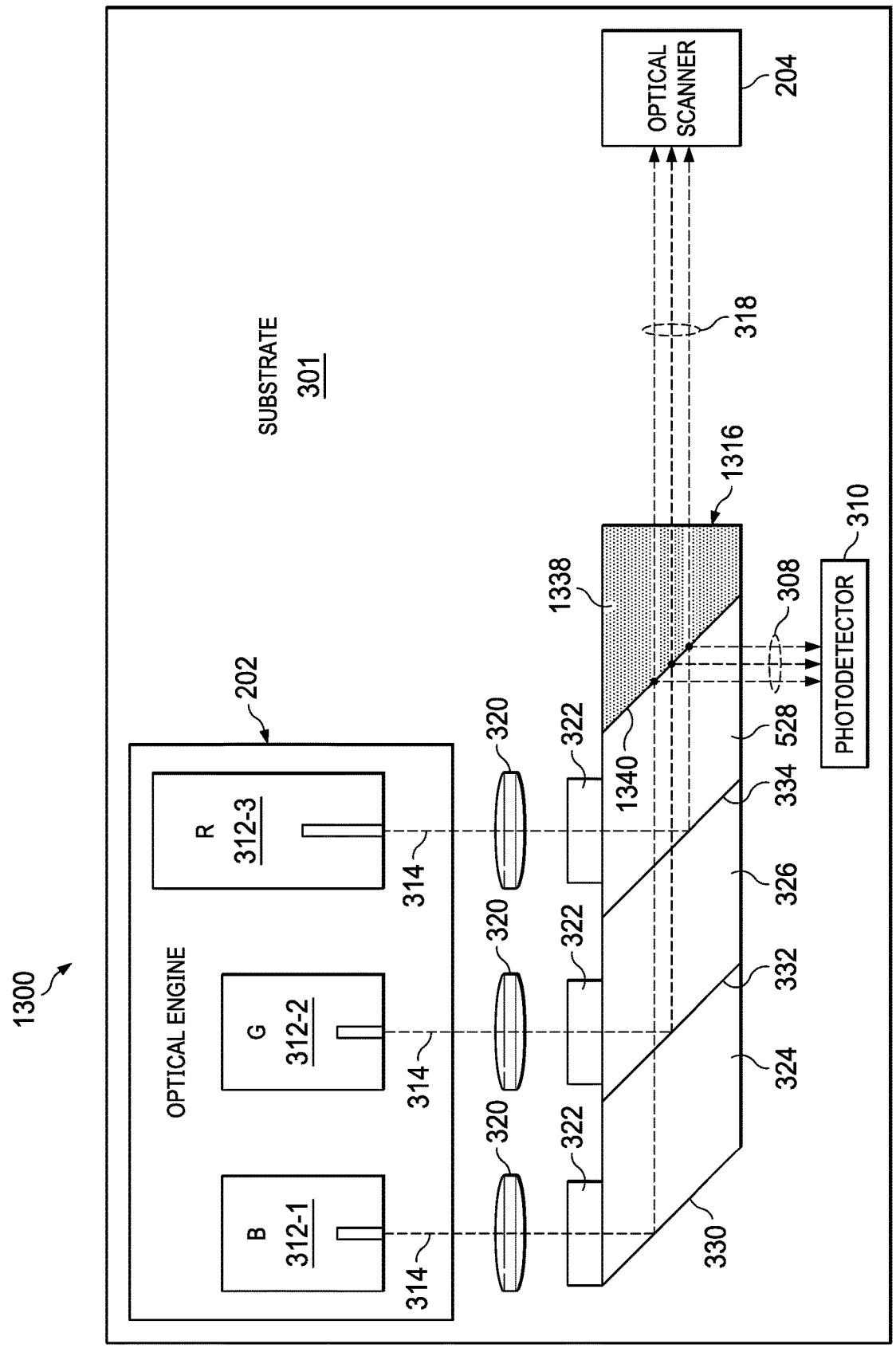
FIG. 13 is a diagram illustrating a perspective view of a laser projector having a beam combiner that includes a secondary index substrate disposed at an end of the beam combiner and adjacent to a primary index substrate, where a pickoff interface between the primary index substrate and the second index substrate redirects a portion of laser light beams incident on the interface toward a photodetector, in accordance with some embodiments.

FIG. 13 shows an illustrative block diagram of a laser projector 1300, which includes a beam combiner 1316 having a secondary index substrate 1338 that is disposed at the second end (opposite the first end at which the first interface 330 is disposed) of the beam combiner 1316, where the secondary index substrate abuts the primary index substrate 528 to form a pickoff interface 1340. It should be noted that embodiments of the laser projector 1300 differ from embodiments of the laser projector 500 of FIG. 5 in that, instead of including a secondary index substrate that is interposed between two primary index substrates to form first and second pickoff interfaces, the secondary index substrate 1338 is disposed at the second end of the beam combiner 1316 and forms only a single pickoff interface 1340 with the primary index substrate 528. Embodiments of the laser projector 1300 are otherwise structurally similar to some embodiments of the laser projector 500 of FIG. 5. In the present example, like reference numerals are used to refer to like elements introduced in any of the preceding examples, and some aspects or functions of such elements may not be repeated here for the sake of brevity.

In the present example, the aggregate laser light beam 318 is incident on the pickoff interface 1340 and is redirected via Fresnel reflection as redirected light 308 toward the photodetector 310 that is disposed across from the first side of the beam combiner 1316. The primary index substrate 528 is formed from a first material having a first index of refraction, while the secondary index substrate 1338 is formed from second material having a second index of refraction that is different from the first index of refraction. According to various embodiments, the first material and the second material are two different materials each selected from N-BK7 Borosilicate Crown glass, fused silica, crown glass, flint glass, sapphire, diamond, Barium Fluoride, Calcium Fluoride, or another applicable optically transmissive material.

While the present example shows the photodetector 310 as being disposed on the first side of the beam combiner 1316, it should be noted that, in other embodiments, the photodetector 310 is instead disposed on the second side of the beam combiner 1316 and a mirror could be placed at the first side of the beam combiner to reflect the redirected light 308 toward the photodetector 310 (e.g., similar to the arrangement of the mirror 802 and photodetector 810 shown in the example of FIG. 8).

While the present example involves redirecting light via Fresnel reflection between substrates having different indices of refraction, it should be understood that in alternate embodiments one or more optical adhesive layers may be disposed at the pickoff interface 1340, where the optical adhesive layers have respective indices of refraction that differ from the respective first and second indices of refraction of the primary and secondary index substrates 528, and 1338, which cause Fresnel reflection to occur between the optical adhesive layers any of the primary and secondary index substrates 528 and 1338 that are in physical contact with the optical adhesive layers.

Figure 14:
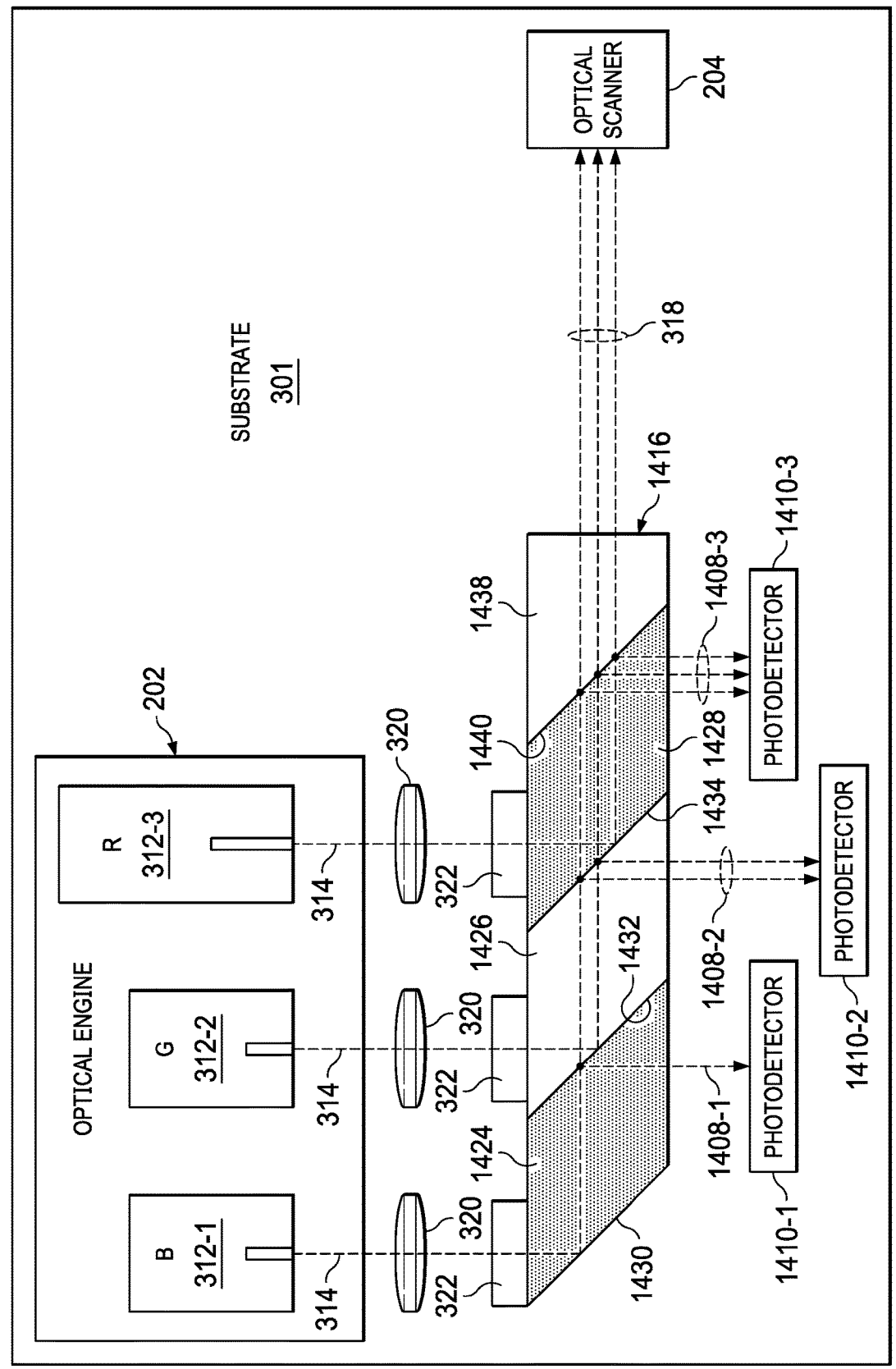
FIG. 14 is a diagram illustrating a perspective view of a laser projector having a beam combiner that includes alternating primary index substrates and secondary index substrates, where each pickoff interface between primary and secondary index substrates redirects a portion of laser light beams incident on the pickoff interface toward a respective photodetector aligned with that pickoff interface, in accordance with some embodiments.

FIG. 14 shows an illustrative block diagram of a laser projector 1400, which includes a beam combiner 1416 having substrates of alternating refractive indices, where interfaces between these substrates redirect a portion of received laser light beams to respective photodetectors, and where some of these interfaces also combine incoming laser light beams. In the present example, like reference numerals are used to refer to like elements introduced in any of the preceding examples, and some aspects or functions of such elements may not be repeated here for the sake of brevity.

In the present example, the beam combiner 1416 includes a first secondary index substrate 1424 that is disposed at a first end of the beam combiner 1416, a first primary index substrate 1426 that is disposed adjacent to the first secondary index substrate 1424, a second secondary index substrate 1428 that is disposed adjacent to the first primary index substrate 1426, and a second primary index substrate 1438 that is disposed adjacent to the second secondary index substrate 1428. The first primary index substrate 1426 is interposed between the first secondary index substrate 1424 and the second secondary index substrate 1428 to form, respectively a first pickoff interface 1432 and a second pickoff interface 1434. The second secondary index substrate 1428 is interposed between the first primary index substrate 1426 and the second primary index substrate 1438 to form, respectively, the second pickoff interface 1434 and a third pickoff interface 1440. In the present example, the first and second primary index substrates 1426 and 1438 are formed from or otherwise include a first material having a first index of refraction, while the first and second secondary index substrates 1424 and 1428 are formed from or otherwise include a second material having a second index of refraction, where the first index of refraction is different from the second index of refraction. According to various embodiments the first material and second material are selected from N-BK7 Borosilicate Crown glass, fused silica, crown glass, flint glass, sapphire, diamond, Barium Fluoride, Calcium Fluoride, or another applicable optically transmissive material.

A first interface 1430 is disposed at the first end of the beam combiner 1416. In some embodiments, a first coating is applied at the first interface 1430 (e.g., is applied to a surface of the first substrate 1424 that acts as the first end of the beam combiner 1416). In some embodiments, the first coating is reflective or substantially reflective to all wavelengths of light. In some embodiments, the first coating (e.g., a first dichroic reflector coating or thin-film) is reflective or substantially reflective to only blue wavelengths of light, which include the wavelength of the laser light beam 314 output by the blue laser source 312-1, and is transmissive or substantially transmissive to other wavelengths of light. In some embodiments, the first interface 1430 is uncoated and reflection of the laser light beam 314 output by the blue laser source 312-1 by the first interface 1430 is achieved via TIR. The first interface 1430 receives the laser light beam 314 output by the blue laser source 312-1 and reflects it down the length of the beam combiner 1416 toward a second end of the beam combiner 1416 and toward the optical scanner 204.

The first pickoff interface 1432 is an interface between the first secondary index substrate 1424 and the first primary index substrate 1426. In some embodiments, a second coating is applied at the first pickoff interface 1432 between the first secondary index substrate 1424 and the first primary index substrate 1426. In some embodiments, the second coating (e.g., a second dichroic reflector coating or thin-film) is reflective or substantially reflective to only green wavelengths of light, which include the wavelength of the laser light beam 314 output by the green laser source 312-2, and is transmissive or substantially transmissive to other wavelengths of light including the blue wavelength of the laser light beam 314 output by the blue laser source 312-1. The first pickoff interface 1432 receives the laser light beam 314 output by the green laser source 312-2 and reflects it down the length of the beam combiner 1416 toward the second end of the beam combiner 1416 and toward the optical scanner 204. The first pickoff interface 1432 also receives the laser light beam 314 output by the blue laser source 312-1, having previously been reflected at the first interface 1430, and passes it without reflection. The first pickoff interface 1432 further causes a Fresnel reflection of the laser light beam 314 output by the blue laser source 1312-1 and redirects a portion of the laser light beam 314 output by the blue laser source 1312-1 toward a first photodetector 1410-1 as first redirected light 1408-1. This Fresnel reflection is caused by the difference in indices of refraction between the first secondary index substrate 1424 and the first primary index substrate 1426.

The second pickoff interface 1434 is an interface between the first primary index substrate 1426 and the second primary index substrate 1428. In some embodiments, a third coating is applied at the second pickoff interface 1434 between the first primary index substrate 1426 and the second primary index substrate 1428. In some embodiments, the third coating (e.g., a third dichroic reflector coating or thin-film) is reflective or substantially reflective to only red wavelengths of light, which include the wavelength of the laser light beam 314 output by the red laser source 312-3, and is transmissive or substantially transmissive to other wavelengths of light including the blue wavelength of the laser light beam 314 output by the blue laser source 312-1 and the green wavelength of the laser light beam 314 output by the green laser source 312-2. The second pickoff interface 1434 receives the laser light beam 314 output by the red laser source 312-3 and reflects it down the length of the beam combiner 1416 toward the second end of the beam combiner 1416 and toward the optical scanner 204. The second pickoff interface 1434 also receives the laser light beam 314 output by the blue laser source 312-1, having previously been reflected at the first interface 1430, and the laser light beam 314 output by the green laser source 312-2 and passes both without reflection. The second pickoff interface 1434 effectively outputs the aggregate laser light beam 318. The second pickoff interface 1434 further causes a Fresnel reflection of the laser light beam 314 output by the blue laser source 1312-1 and the laser light beam 314 output by the green laser source 1312-2 and redirects portions of these laser light beams toward a second photodetector 1410-2 as second redirected light 1408-2. This Fresnel reflection is caused by the difference in indices of refraction between the first primary index substrate 1426 and the second secondary index substrate 1428.

The third pickoff interface 1440 is an interface between the second secondary index substrate 1428 and the second primary index substrate 1438. The third pickoff interface 1440 causes a Fresnel reflection of the aggregate laser light beam 318 and redirects portions thereof toward a third photodetector 1410-3 as third redirected light 1408-3. This Fresnel reflection is caused by the difference in indices of refraction between the second secondary index substrate 1428 and the second primary index substrate 1438.

By receiving the first redirected light 1408-1, the first photodetector 1410-1 detects the intensity of a portion of the laser light beam 314 output by the blue laser source 312-1, based on which the laser output power of the blue laser source 312-1 can be calculated by a system that includes the laser projector 1400 (e.g., one or more computer processors thereof).

By receiving the second redirected light 1408-2, the second photodetector 1410-2 detects the intensity of a portion of the laser light beams 314 output by the blue laser source 312-1 and the green laser source 312-2, based on which the combined laser output power of the blue laser source 312-1 and the green laser source 312-2 can be calculated by the system. The output power of only the green laser source 312-2 can then be calculated by the system as a difference between the combined laser output power of both the blue laser source 312-1 and the green laser source 312-2 (calculated based on the light intensity detected by the second photodetector 1410-2) and the laser output power of the blue laser source 312-1 (calculated based on the light intensity detected by the first photodetector 1410-1).

By receiving the third redirected light 1408-3, the third photodetector 1410-3 detects the intensity of a portion of the laser light beams 314 output by the blue laser source 312-1, the green laser source 312-2, and the red laser source 312-3, based on which the combined laser output power of the blue laser source 312-1, the green laser source 312-2, and the red laser source 312-3 can be calculated by the system. The output power of only the red laser source 312-2 can then be calculated by the system as a difference between the combined laser output power of each of the blue laser source 312-1, the green laser source 312-2, and the red laser source 312-3 (calculated based on the light intensity detected by the third photodetector 1410-3) and the combined laser output power of both the blue laser source 312-1 and the green laser source 312-2 (calculated based on the light intensity detected by the second photodetector 1410-2).

In this way, the respective laser output powers of each of the blue, green, and red laser sources 312-1, 312-2, and 312-3 can be determined by the system due, at least in part, to the arrangement of the beam combiner 1416 and the first, second, and third photodetectors 1410-1, 1410-2, and 1410-3 of the present example.

While the present example involves redirecting light via Fresnel reflection between substrates having different indices of refraction, it should be understood that in alternate embodiments one or more optical adhesive layers may be disposed at any or all of the first, second, and third pickoff interfaces 1430, 1434, and 1440, where the optical adhesive layers have respective indices of refraction that differ from the respective first and second indices of refraction of the primary and secondary index substrates 1426, 1438, 1424, and 1428, which cause Fresnel reflection to occur between the optical adhesive layers any of the primary and secondary index substrates 1426, 1438, 1424, and 1428 that are in physical contact with the optical adhesive layers.

Figure 15:
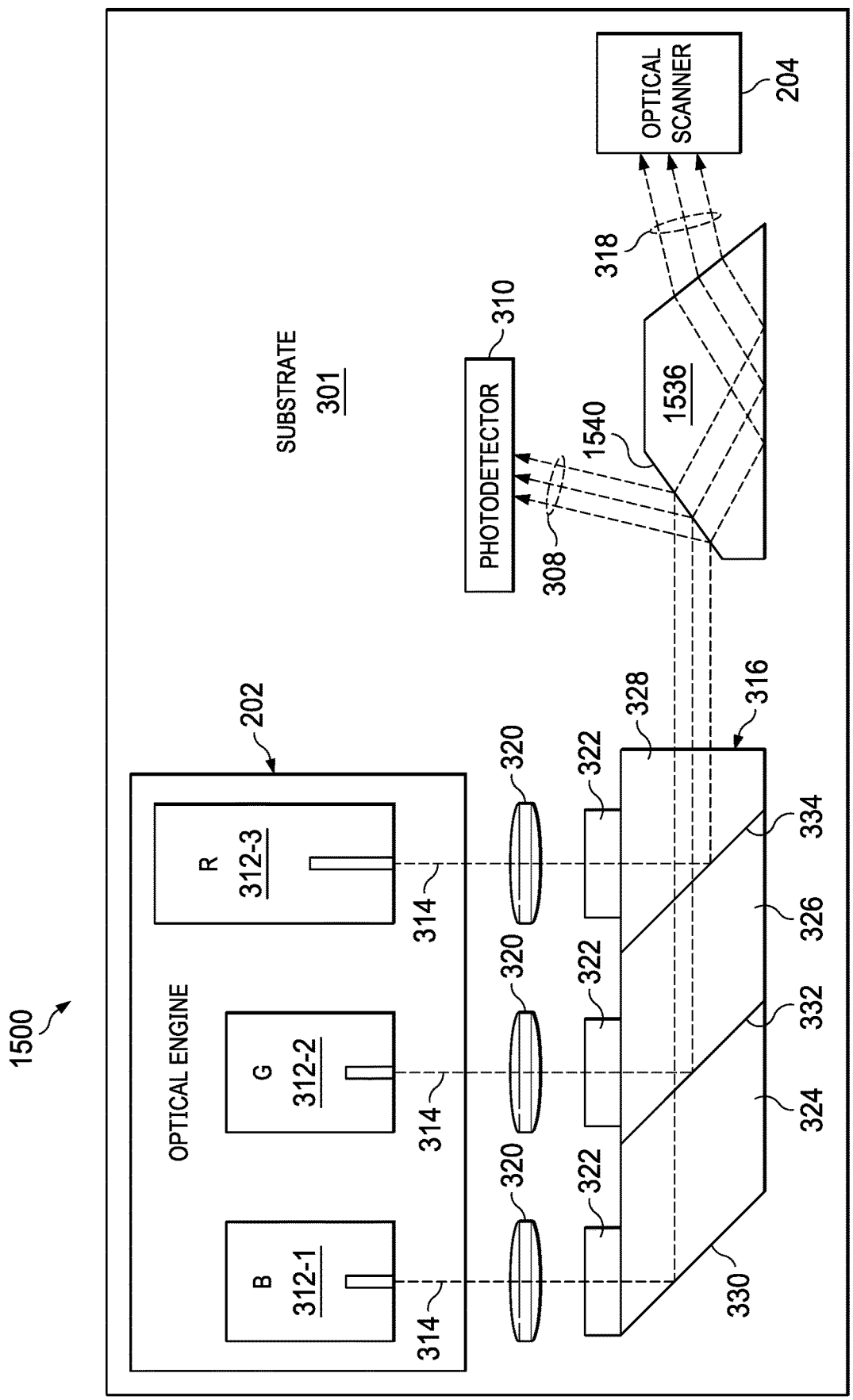
FIG. 15 is a diagram illustrating a perspective view of a laser projector having a beam combiner and a prism, where the prism is separate from the beam combiner and Fresnel reflection of laser light beams at an input interface of the prism redirects a portion of the laser light beams toward a photodetector, in accordance with some embodiments.

FIG. 15 shows an illustrative block diagram of a laser projector 1500 that utilizes a prism 1536 as a pickoff element to redirect laser light to a photodetector 310 via Fresnel reflection. In the present example, like reference numerals are used to refer to like elements introduced in any of the preceding examples, and some aspects or functions of such elements may not be repeated here for the sake of brevity.

In the present example, an input interface 1540 (i.e., an interface at which the prism 1536 receives the aggregate laser light beam 318) of the prism 1536 causes a Fresnel reflection of the aggregate laser light beam 318, resulting in a portion of the aggregate laser light beam 318 being redirected toward the photodetector 310 as part of redirected light 308. For example, the Fresnel reflection may be caused by a difference between the index of refraction of air and the index of refraction of a first material from which the prism 1536 is formed (at least in part). According to various embodiments, the first material includes N-BK7 Borosilicate Crown glass, fused silica, crown glass, flint glass, sapphire, diamond, Barium Fluoride, Calcium Fluoride, or another applicable optically transmissive material.

It should be noted that embodiments of the laser projector 1500 differ from some embodiments of the laser projector 300 of FIG. 3 with respect to the placement of the photodetector 310 and the use of the prism 1536 in place of the pickoff element 306. Embodiments of the laser projector 1500 are otherwise structurally similar to some embodiments of the laser projector 300 of FIG. 3.

Figure 16:
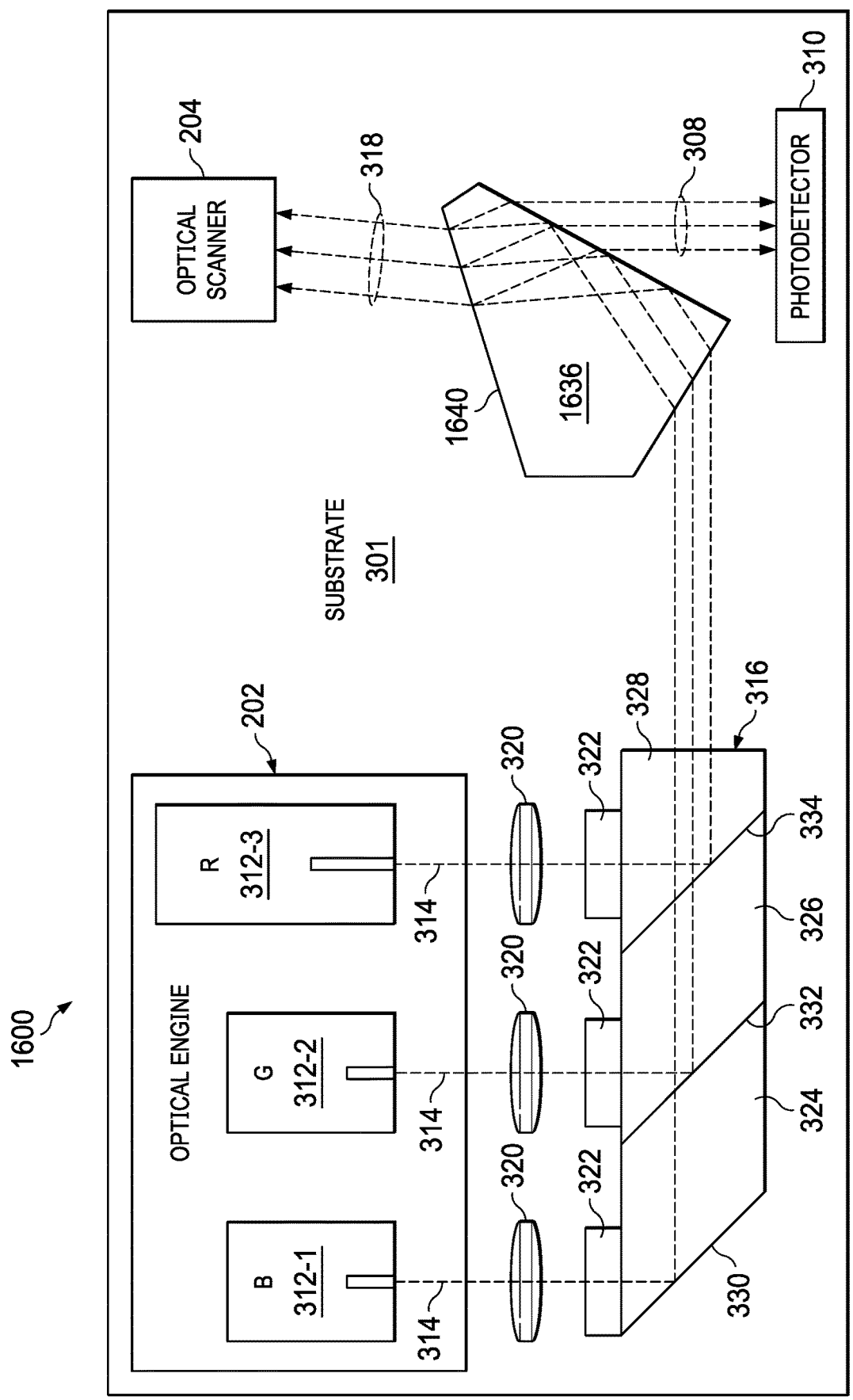
FIG. 16 is a diagram illustrating a perspective view of a laser projector having a beam combiner and a prism, where the prism is separate from the beam combiner and Fresnel reflection of laser light beams at an output interface of the prism redirects a portion of the laser light beams toward a photodetector, in accordance with some embodiments.

FIG. 16 shows an illustrative block diagram of a laser projector 1500 that utilizes a prism 1636 as a pickoff element to redirect laser light to a photodetector 310 via Fresnel reflection. In the present example, like reference numerals are used to refer to like elements introduced in any of the preceding examples, and some aspects or functions of such elements may not be repeated here for the sake of brevity.

In the present example, an output interface 1640 (i.e., an interface at which the prism 1636 outputs the aggregate laser light beam 318 toward the optical scanner 204) of the prism 1636 causes a Fresnel reflection of the aggregate laser light beam 318, resulting in a portion of the aggregate laser light beam 318 being redirected toward the photodetector 310 (first passing back through a portion of the prism 1636, as shown) as part of redirected light 308. For example, the Fresnel reflection may be caused by a difference between the index of refraction of air and the index of refraction of a first material from which the prism 1636 is formed (at least in part). According to various embodiments, the first material includes N-BK7 Borosilicate Crown glass, fused silica, crown glass, flint glass, sapphire, diamond, Barium Fluoride, Calcium Fluoride, or another applicable optically transmissive material.

It should be noted that embodiments of the laser projector 1600 differ from some embodiments of the laser projector 300 of FIG. 3 with respect to the placement of the photodetector 310 and the optical scanner 204 and the use of the prism 1636 in place of the pickoff element 306. Embodiments of the laser projector 1600 are otherwise structurally similar to some embodiments of the laser projector 300 of FIG. 3.

While preceding examples utilize optical engines having red, green, and blue laser sources, it should be understood that embodiments of the laser projectors described herein may additionally or alternatively include other types of laser sources, including infrared laser sources, ultraviolet laser sources, or both.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A laser projection system comprising:
   a photodetector; and
   a pickoff element comprising a first surface, the pickoff element being configured to redirect a first portion of received light toward the photodetector via a first Fresnel reflection and a second portion of the received light toward the photodetector via a second Fresnel reflection such that the first portion of the received light at least partially overlaps the second portion of the received light at the photodetector.

2. The laser projection system of claim 1, wherein the pickoff element comprises a first interface at the first surface between a first material having a first index of refraction and a second material having a second index of refraction, the first index of refraction being different from the second index of refraction, and wherein the first portion of the received light is redirected toward the photodetector from the first interface via the first Fresnel reflection.

3. The laser projection system of claim 2, wherein the first material comprises at least one of N-BK7 Borosilicate Crown glass, fused silica, crown glass, flint glass, sapphire, diamond, Barium Fluoride, or Calcium Fluoride, and wherein the second material comprises air.

4. The laser projection system of claim 3, wherein the pickoff element comprises:
   a second surface opposite the first surface; and
   a second interface at the second surface between the first material and the second material.

5. The laser projection system of claim 3, wherein the pickoff element comprises:
   a second surface opposite the first surface; and
   an anti-reflective coating disposed on the second surface.

6. The laser projection system of claim 3, wherein the pickoff element is a prism and the first surface is an input surface of the prism at which the prism receives the received light.

7. The laser projection system of claim 3, wherein the pickoff element is a prism and the first surface is an output surface of the prism through which the prism outputs the received light.

8. The laser projection system of claim 1, further comprising:
   an optical engine that includes a plurality of laser sources configured to generate a plurality of laser light beams;
   a beam combiner configured to combine the plurality of laser light beams into an aggregate laser light beam and to output the aggregate laser light beam, wherein the received light comprises the aggregate laser light beam, and the laser projection system is configured to determine a laser output power of one or more of the plurality of laser sources of the optical engine; and
   an optical scanner configured to receive the aggregate laser light beam from the beam combiner after the aggregate laser light beam passes through the pickoff element and to scan the aggregate laser light beam; and
   a waveguide configured to receive the scanned aggregate laser light beam from the optical scanner and to project the scanned aggregate laser light beam.

9. A laser projection system comprising:
   a first photodetector; and
   a beam combiner configured to:
      receive a first laser light beam and a second laser light beam; and
      combine the first laser light beam and the second laser light beam into an aggregate laser light beam, wherein the beam combiner comprises:
         a first pickoff interface configured to redirect a first portion of the aggregate laser light beam toward the first photodetector via a first Fresnel reflection; and
         a mirror disposed at a first side of the beam combiner, wherein the mirror reflects at least some of the first portion of the aggregate laser light beam toward the first photodetector, and
      wherein the first photodetector is disposed at a second side of the beam combiner that is opposite the first side.

10. The laser projection system of claim 9, wherein the beam combiner further comprises:
    a first primary index substrate comprising a first material having a first index of refraction; and
    a first secondary index substrate comprising a second material having a second index of refraction that is different from the first index of refraction, wherein the first pickoff interface is disposed directly between the first primary index substrate and the first secondary index substrate.

11. The laser projection system of claim 10, wherein the first material and the second material comprise respectively different materials selected from a group consisting of N-BK7 Borosilicate Crown glass, fused silica, crown glass, flint glass, sapphire, diamond, Barium Fluoride, Calcium Fluoride, and air.

12. The laser projection system of claim 11, wherein the beam combiner further comprises:
    a second primary index substrate comprising the first material having the first index of refraction; and
    a second pickoff interface that is disposed directly between the first secondary index substrate and the second primary index substrate, wherein the second pickoff interface is configured to redirect a second portion of the aggregate laser light beam toward the first photodetector via a second Fresnel reflection.

13. The laser projection system of claim 12, wherein a first optical path of the first portion of the aggregate laser light beam that is redirected by the first pickoff interface is separate from a second optical path of the second portion of the aggregate laser light beam that is redirected by the second pickoff interface.

14. The laser projection system of claim 12, wherein a first optical path of the first portion of the aggregate laser light beam that is redirected by the first pickoff interface at least partially overlaps a second optical path of the second portion of the aggregate laser light beam that is redirected by the second pickoff interface.

15. The laser projection system of claim 12, further comprising:
    a mirror disposed at a first side of the beam combiner, wherein the mirror reflects at least some of the first portion and the second portion of the aggregate laser light beam toward the first photodetector, and wherein the first photodetector is disposed at a second side of the beam combiner that is opposite the first side.

16. The laser projection system of claim 15, further comprising:
an additional mirror disposed at the second side of the beam combiner, wherein the additional mirror receives the first portion and the second portion of the aggregate laser light beam from the mirror and reflects the first portion and the second portion of the aggregate laser light beam onto a surface of the first photodetector.

17. The laser projection system of claim 15, wherein the mirror is fully reflective of the first portion and the second portion of the aggregate laser light beam.

18. The laser projection system of claim 15, wherein the mirror is only partially reflective of the first portion and the second portion of the aggregate laser light beam, such that a first fraction of the first portion and the second portion of the aggregate laser light beam is reflected toward the first photodetector and a second fraction of the first portion and the second portion of the aggregate laser light beam passes through the mirror.

19. The laser projection system of claim 18, wherein the mirror is configured to have a wavelength-dependent reflectivity profile that causes the mirror to normalize a non-uniform response profile of the first photodetector for light that is reflected off of the mirror onto the first photodetector.

20. The laser projection system of claim 18, further comprising:
a second photodetector that is disposed at the first side of the beam combiner and that is configured to receive the second fraction of the first portion and the second portion of the aggregated laser light beam that passes through the mirror.

21. The laser projection system of claim 11, wherein the first secondary index substrate is disposed at a first end of the beam combiner, and wherein the aggregate laser light beam exits the beam combiner through the first end.

22. The laser projection system of claim 11, wherein the beam combiner further comprises:
a second photodetector; a third photodetector;
a second primary index substrate comprising the first material;
a second secondary index substrate comprising the second material;
a second pickoff interface that is disposed between the first secondary index substrate and the second primary index substrate, wherein the second pickoff interface is configured to redirect only the first laser light beam and the second laser light beam toward the second photodetector via a second Fresnel reflection; and
a third pickoff interface that is disposed between the second primary index substrate and the second secondary index substrate, wherein the third pickoff interface is configured to redirect only the first laser light beam toward the third photodetector via a third Fresnel reflection.

23. A method comprising:
redirecting, via a first Fresnel reflection at a first interface between a first material having a first index of refraction and a second material having a second index of refraction, a first portion of received light toward a photodetector;
redirecting, via a second Fresnel reflection at a second interface between the first material and the second material, a second portion of the received light toward the photodetector such that the first portion of the received light at least partially overlaps the second portion of the received light at the photodetector; and
detecting, with the photodetector, an intensity of the first portion of the received light at least partially overlapping the second portion of the received light.

* * * * *